(12) United States Patent
Advincula

(10) Patent No.: US 8,669,335 B2
(45) Date of Patent: Mar. 11, 2014

(54) KNOTTY POLYMERS VIA SUPRAMOLECULARLY TEMPLATED MACROINITIATORS AND LIVING POLYMERIZATION AND METHODS FOR MAKING AND USING SAME

(75) Inventor: Rigoberto Advincula, Friendswood, TX (US)

(73) Assignee: The University of Houston System, Houston, TX (US)

( * ) Notice: Subject to any disclaimer, the term of this patent is extended or adjusted under 35 U.S.C. 154(b) by 179 days.

(21) Appl. No.: 13/028,057

(22) Filed: Feb. 15, 2011

(65) Prior Publication Data

US 2011/0207878 A1  Aug. 25, 2011

Related U.S. Application Data

(60) Provisional application No. 61/304,683, filed on Feb. 15, 2010.

(51) Int. Cl.
*C09D 133/12* (2006.01)
*C08F 8/48* (2006.01)

(52) U.S. Cl.
USPC ........ 526/183; 526/329.7; 526/190; 526/217; 525/330.3; 525/330.4; 524/560

(58) Field of Classification Search
USPC ............ 526/183, 190, 217, 329.7; 525/330.3, 525/330.4; 524/560
See application file for complete search history.

(56) References Cited

U.S. PATENT DOCUMENTS 5,677,399 A * 10/1997 Hall ............................... 526/83

OTHER PUBLICATIONS

Dietrich-Buchecker et al. J. Am. Chem. Soc. 1993, 115, 11237-11244.*
Dietrich-Buchecker et al. Chem. Commun 1997, 2053-2054.*

* cited by examiner

*Primary Examiner* — Mark Kaucher
(74) *Attorney, Agent, or Firm* — Robert W Strozier

(57) ABSTRACT

A design, synthesis and use of templated chemical routes are disclosed for the synthesis of interlocked macromolecular structures and orderly entanglements that are dubbed "Knotty Polymers" using combined supramolecularly assembled macroinitiators and living polymerization.

25 Claims, 25 Drawing Sheets a) $AB \xrightleftharpoons{k_d} A\cdot + \cdot B$ b) $A\cdot + M \xrightarrow{k_p} A\sim\cdot$ c) $A\sim\cdot + \cdot B \xrightleftharpoons{k_c} A\sim B$
   $(M)$ d) $A\sim\cdot + AB \xrightleftharpoons{k_{tr}} A\sim B + \cdot A$ e) $A\sim\cdot + B\sim A \xrightleftharpoons{k_{tr}} A\sim B + \cdot\sim A$ f) $A\sim\cdot + \cdot\sim A \xrightarrow{k_t} A\sim A$

FIG. 26

KNOTTY POLYMERS VIA SUPRAMOLECULARLY TEMPLATED MACROINITIATORS AND LIVING POLYMERIZATION AND METHODS FOR MAKING AND USING SAME

CROSS REFERENCES TO RELATED APPLICATIONS

This application claims the benefit of and provisional priority to U.S. Provisional Patent Application Ser. No. 61/304,683, filed 15 Feb. 2010.

GOVERNMENTAL SPONSORSHIP

The U.S. Government has a paid-up license in this invention and the rights in limited circumstances to require the patent owners to license others on reasonable terms as provided for by the terms of National Science Foundation grant No. CHE-1041300.

REFERENCE TO A SEQUENTIAL LISTING

Not Applicable.

BACKGROUND OF THE INVENTION

1. Field of the Invention

Embodiments of the present invention relates to designs, syntheses and uses of templated chemical routes for synthesizing interlocked macromolecular structures and orderly or programmed entanglements that are referred sometimes herein as "knotty polymers".

More specifically, embodiments of this invention makes uses of combined supramolecularly assembled macroinitiator or iniferters and living or living-radical polymerization or polyhomologation in a ring expansion mechanism for synthesizing interlocked macromolecular structures and orderly entanglements that are referred sometimes herein as knotty polymers. This also includes the living polymerization from a supramolecularly assembled macroinitiator followed by ring or loop formation by end-group coupling.

2. Description of the Related Art

Supramolecular assembly and the study of orderly molecular entanglements offer unique challenges in the most subtle and demanding aspects of stereochemistry, regiochemistry, and mechanistic control. Geometry, symmetry, and topology unite in chemical templates to enable reaction pathways leading to intricate extended macromolecular architectures. By combining in-situ living or living free-radical polymerization methods with supramolecularly ordered templates, new paradigms in macromolecular structure-property relationships are expected as inspired by Knot Theory.

2.1 Knot Theory

Mathematical Knot Theory, the formal discipline dealing with knots and links, evolved from the early work of chemists in the middle of the 19th century. Mathematicians describe a "knot" as a cord that is intertwined with itself, with its loose ends joined so that it cannot become untangled. This definition makes a macrocycle, a rudimentary knot, or the "unknot". If two or more knots are interlocked with each other, the result is called a "link". A [2]-catenane is a link composed of two unknots. Since their inception, chemical templates and supramolecular assembly have provided exciting new molecular topologies that are inspired by Knot Theory. However, both art and science have examples of intractable and symbolic knots, which include the Borromean sign, the Book of Kells, the works of Escher, Möbius strip, etc. as illustrated in FIG. 1. Topology in association with Graph Theory is a branch of mathematics of high interest. Chemical topology is Graph theory applied to chemistry. Many aspects of chemical topology from DNA to stereochemical reactions have been studied. This realm of orderly molecular entanglements encompasses a melange of well-reported interlocked molecular and supramolecular architectures as espoused by Sauvage, Stoddart, Wasserman, Busch, Walba, etc.: from nano-objects to macrame and molecular braids almost analogous to weaving, knitting, and crocheting and their three-dimensional counterparts. A number of reports have demonstrated intricate sequences of steps (threadings, cross-overs, ring closings, and other linkages) in order to form complicated orderly knot entanglements with elements of chirality.

There are many structural motifs that have been achieved through small molecule templates, however very few if none have been demonstrated with high molecular weight (MW) polymers except through statistical tethering of telechelics. The present invention offers a novel synthetic route to produce model high MW entangled polymers by programmed sequential steps from self-assembly to living polymerization. The resulting molecules are referred to herein as "knotty polymers".

2.2 Molecular and Supramolecular Assembly

A chemical template organizes an assembly of molecules, with respect to one or more geometric loci, in order to achieve a particular link. A particular assembly focuses on those that generate interlocked assemblies between otherwise independent molecules; e.g., rotaxanes, catenanes, separate knots, knots joining strands, mechanically linked oligomers and polymers, and braided, knitted or woven structures constructed by the interlocking of linear molecules. Creating continuous and intricate molecular architectures requires a particular linking of molecules to establish an interlocking architecture. This requires the formation of one or more chemical bonds, while the template organizes the assembly of atoms. Equally important, the template may involve components that, like catalysts, do not become permanent parts of the molecular architectures and may be used for disassembly. There are two classes of chemical templates: kinetic templates that influence the mechanistic pathway and thermodynamic or equilibrium templates that select and bind certain complementary structures from among an equilibrating mixture of structures. Kinetic templates are of primary importance in generating molecularly interlocked structures. Supramolecular structures involve multiple levels of interactions and are considered larger in size than a typical complex, but basically use the same assembly elements.

2.1.1 Chemical Template Design

In any chemical template, an anchor constitutes the first component (a metal ion, ion pair complement, partial charge complement, or hydrogen bonded partner); this anchor holds an appropriate conjugate component, or components. One important role performed by such an anchor-constrained component is to build a turn into the emerging structure; appropriately, such a component is called a molecular turn. Molecular turns have two or more terminal, or near terminal, reactive groups, each pointed in a critical, often in the same direction. This simple kind of molecular template is composed of an anchor and a molecular turn, and the turn may be intrinsic in the structure of the conjugate component or, in the case of a more flexible conjugate component, it may be caused by the anchor.

A typical design uses Sauvage's highly successful phenanthroline templates as illustrated in FIG. 2, as well as alternative metal ion templates that are currently under investigation by a number of groups. Hydrogen bonding anchors for templates are almost as diverse as are metal ion anchors, but they differ sharply in that they generally involve multicentric interactions. DNA is an example that is also of high interest biologicially. There are many other examples which include Busch:Stoddart secondary ammonium ion anchors and the Hunter:Vogtle:Leigh diamide templates. Cyclodextrin templates contain significant hydrogen bonds. The Stoddart template is formed between electron rich aromatic ether moieties and paraquat-containing moieties, as p-donor: acceptor templates as illustrated in FIG. 3. In summary, these important templates include, but are not limited to, ion-ligand complexation, p-p stacking, ion-dipole attractions and hydrogen bonding interactions, which combine to force molecular strands into turns.

2.1.2 Kinetic Template Effect

The kinetic template effect is the ability of the metal ion anchor to predictably control the spatial orientation of reactive groups during the formation of critical linkages. Metal ion anchors offer the advantage that they can often be readily removed, leaving the interlocked structure intact even after the cyclization reaction Innumerable examples have been reported of macrocycles, macrobicycles, macrocycles with appendages, appended macrocycles, ditopic, tritopic, etc.

Statistical vs. Preformed

An important aspect of chemical template synthesis is in understanding statistical threading—an appropriate baseline methodology since it depends on the probability that a linear molecule will penetrate and occupy the space within a macrocycle without the benefit of any particular intermolecular attraction. Threading is a simple elemental step of great importance to the formation of interlocked structures. It is well known that chemical templates can organize molecular cross-overs, through the use and location of their turns and anchors, but producing the first interlocked polymers and molecular cloths constitute daunting challenges that can depend on the yields of single steps of the sequential chemical reactions. Wasserman estimated the statistical probability for threading a linear molecule through a macrocycle to be less than 0.01, supported by experimental findings. Similarly, the classic study by Harrison and Harrison of rotaxane formation with the ring component bound to a Merrifield resin revealed that 70 successive applications of the statistical threading and blocking reactions resulted in only 6% of the rings being converted to rotaxane. In contrast, template threading is based on mutually attracting participants (to form a template complex). Many studies involving single threadings using various templates that give much higher yields—up to 92% in the best case with metathesis, have been reported.

Principle of Least Reagent

For interlocking turns, choosing and locating the terminal functional groups so that no additional linking atoms (or a minimum number) are required to complete the ring greatly facilitates the efficiency of catenane formation as shown in FIG. 4. The advantage probably derives in large part from the reduced competition between the formation of intramolecular and intermolecular linkages. Other advantages should stem from reclaiming the ability to use a large excess of a second reagent and the fact that no additional atoms are needed to form the final ring. This has been called the principle of least reagent which can be applied to obtain higher yields in catenane formation.

The Trefoil Knot

The trefoil knot is the simplest knot (outside of the unknot) that can be demonstrated. Sauvage has reported the synthesis of the first molecular example by linking two of his phenanthroline-based molecular turns together with a methylene group, producing a pair of linked turns. Complexation of such a ligand:conjugate with copper(I) gave a mixture of products, and, in the structure of greatest interest, two ligands combine with two copper(I) ions to form a double helical complex. The pair of didentate turns constituting a single ligand are twisted orthogonally (with respect to each other) at the linkage between the two copper ions. Creating two new links between each ligand in the double helical complex and the other by a pair of polyglycol chains producing a trefoil knot in 3% yield as shown in FIG. 5. Removal of the metal ion (demetalation) gives a molecule having the same linkages as a large macrocycle made up of two molecules of the double-turn and two molecules of the bridging unit. However, the new molecule is a knot and is topologically very different from the simple macrocycle (unknot)—the two topological isomers cannot be interconverted without breaking at least one chemical bond—the Trefoil Knot. The yield of the trefoil knot can be remarkably improved by replacing the methylene group connecting the pair of turns with an m-phenylene group. The extension of this helical approach to larger linear arrays of metal ions is possible. Sauvage pointed out that even numbers of cross-overs (i.e. tetrahedral copper(I) plus pairs of turns) always produces increasingly complex knots, while odd numbers of cross-overs lead to increasingly complex multiply interlocked [2]-catenanes as shown in FIG. 5.

2.3 RAFT Polymerization

RAFT polymerization is one of the more versatile and robust techniques in the spectrum of "living" or living radical polymerization methods, which includes atom transfer radical polymerization (ATRP), nitroxide mediated polymerization (NMP), and others. It is applicable to a broad range of monomers and polymerizations and can be conducted under conventional conditions, i.e. using existing recipes and equipment to which the RAFT iniferter is added. It has been shown that a minimum value of 10 on the transfer constant is required to obtain low polydispersity material in batch polymerizations. For RAFT polymerizations to obey the rules of living polymerizations, a few aspects in the reaction scheme are of importance: 1) A rapid exchange reaction, 2) Good homolytically leaving R group, capable of reinitiation, and 3) Constant number of chains during the polymerization. For the chain transfer agent (CTA) or iniferter, dithioesters are unsurpassed in activity by xanthates, trithiocarbonates and thiocarbamates. Aromatic dithioesters that contain a dithiobenzoate moiety are likewise common. For clarity and consistency in RAFT terminology, general reaction schemes make use of Z and R to indicate the activating group and the leaving group of the RAFT agent respectively as shown in FIG. 6. The structures of the R and Z groups are of critical importance to a successful RAFT polymerization. The R group of a RAFT agent is important in the pre-equilibrium stage of the polymerization. The R group should be a better leaving group than the propagating radical and must efficiently reinitiate monomer as an expelled radical. Steric factors, radical stability, and polar effects are significant in determining the leaving/reinitiating ability of an R group. Increased radical stability enables the R group to be a good leaving group; however, if the radical is too stabilized, it may not effectively add onto a monomer and reinitiate polymerization. The Z group of a RAFT agent is highly influential in determining its reactivity and consequently its effectiveness at mediating polymerization. The Z group should be chosen so that it will activate the $C=S$ bond toward radical addition and then impart minimal stabilization of the adduct radical formed. If the stabilizing effect of the Z group is too high, fragmentation may not be favored and inhibition of the polymerization (in the initial step) or retardation (in the main process) might be observed. It is necessary to choose a Z group that is suitable for mediating the polymerization of a specific monomer.

Referring now to FIGS. 7a &b, a schematic representation of reversible addition fragmentation chain transfer using a dithioester Compound 1 is shown. FIG. 7a shows a reaction of the initial transfer agent with a propagating radical, forming a dormant species Compound 3 and releasing radical R. The expelled radical initiates polymerization and forms a propagating chain. FIG. 7b shows an equilibrium between active propagating chains and dormant chains with a dithioester moiety. Note that all reactions are equilibria, but that the k values refer to the downward direction of the reaction. Also note that these equilibria are not restricted to specific pairs of chains, but that any radical may react with any dormant species/RAFT agent.

Prior art shows that while a number of RAFT polymerization systems have been reported through the years under solution, bulk, and emulsion conditions, confined or even surface controlled RAFT polymerizations have specific and unique parameters. Thus, there is a need in the art for other systems and methods of making knotty polymers.

SUMMARY OF THE INVENTION

Embodiment of the present invention provide uses of a living or living-radical RAFT polymerization and polyhomologation in closely linked and spaced dithioesters and like molecules. The invention makes use of a supramolecularly templated macroinititor involving complexation which can include the incorporation of a RAFT-CTA. This include mitigating a number of reaction pathways for the active specie or radical that can degrade the reaction, preventing propagation or result in many by-products. This requires optimization of reaction conditions and molecular structure design. By doing so, it is possible to match the design of the macroinitiator or RAFT-CTA iniferters within the templated knot to get the desired propagation, ring expansion, and living polymerization conditions. In general, the macroinitiator is formed by supramolecular assembly followed by a ring closure reaction. These templated macroinitiators are then optimized for a ring-expansion or monomer-insertion polymerization. This also includes the living polymerization from a supramolecularly assembled macroinitiator followed by ring or loop formation by end-group coupling. Using these novel approaches with oligomeric to high polymer molecular weights is the equivalent of a molecular sewing, knitting, or weaving machine—via a combined supramolecular and living free-radical polymerization approach.

BRIEF DESCRIPTION OF THE DRAWINGS

The invention can be better understood with reference to the following detailed description together with the appended illustrative drawings in which like elements are numbered the same:

FIG. 26 depicts pathways for a radical in RAFT.

DETAILED DESCRIPTION OF THE INVENTION

4. Embodiments of the Invention

Template Formation

Figure 8:
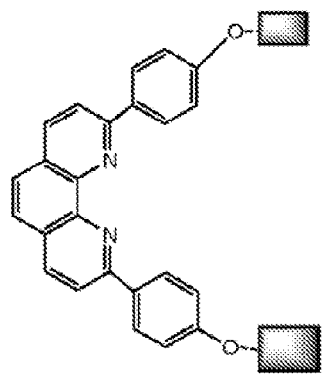
FIG. 8 depicts an embodiment of a ligand template of this invention.
Figure 9:
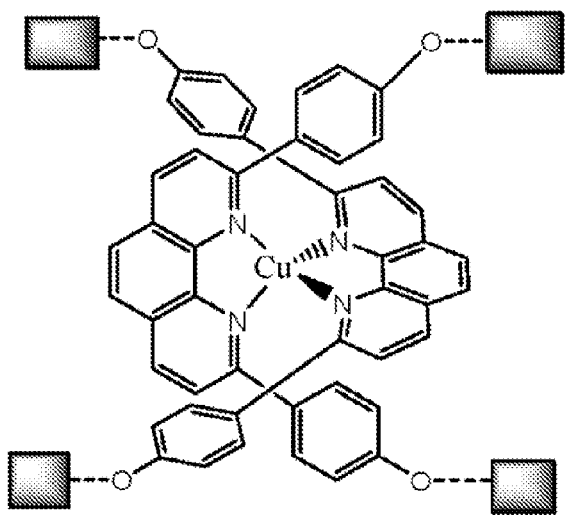
FIG. 9 depicts an embodiment of an assembled template by metal complexation of FIG. 8.
Figure 10:
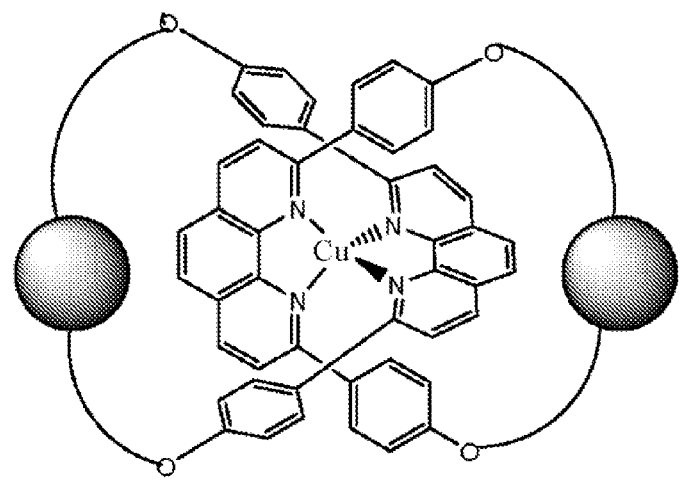
FIG. 10 depicts a ring closure of the assembled template of FIG. 9 via coupling reactions incorporating an initiator group for a living and ring expansion polymerization.
Figure 11:
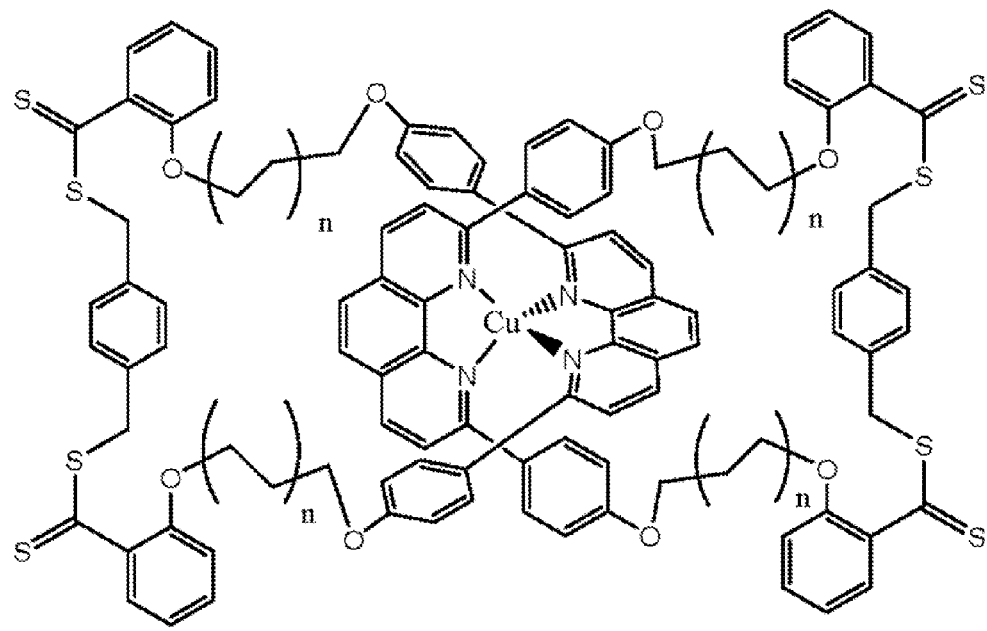
FIG. 11 depicts a specific example of an optimized living radical RAFT polymerized macrocycle of a desired size using the assembled template of FIG. 9.
Figure 12:
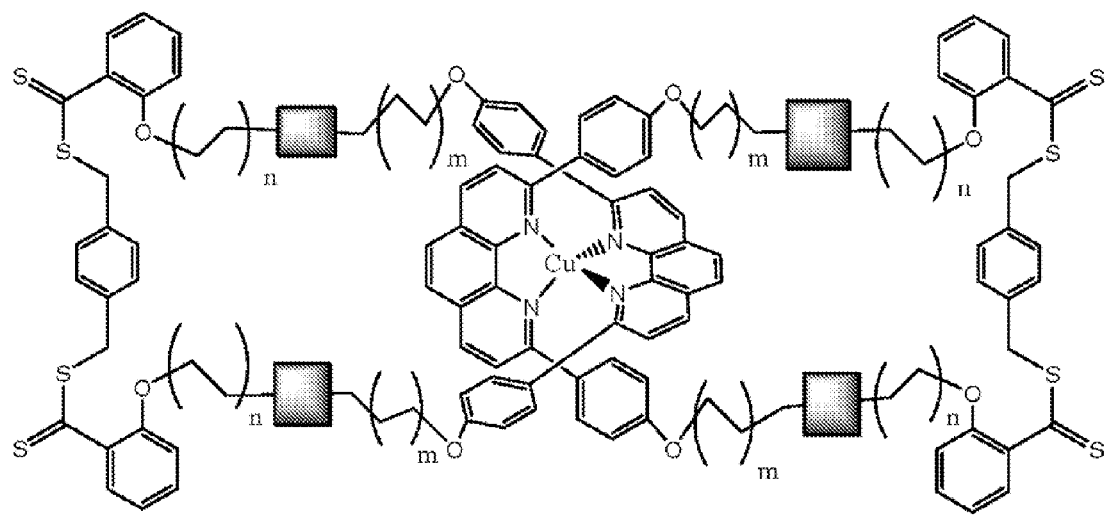
FIG. 12 depicts an embodiment of a RAFT macroinitiator that has been formed by coupling two end-groups of a supramolecular template and the two end-groups of a thioester RAFT-CTA.

Interlocked chemical templates are synthesized via non-covalent interactions of self-assembling complexes incorporated or capped with reversible addition fragmentation chain-transfer (RAFT) iniferters. The interlocked elements are designed for specific synthetic routes incorporating Knot Theory for controlled chain entanglement, macrocycle, and macropolycycle formation. In general, the ligand template, as shown in FIG. 8, is first synthesized to have a minimum of two reactive end-groups capable of reacting by a number of "coupling reactions" which includes click chemistry (azide), olefin metathesis ring closure, diacetylene formation, thiol-ene chemistry, etc. The ligands are then assembled by metal complexation, as shown in FIG. 9, or by other non-covalent linking methods. The next step will be ring closure with any of the above coupling reactions which incorporates an initiator group for a living and ring expansion polymerization as shown in FIG. 10. A specific example is an optimized living radical RAFT polymerization that satisfies macrocycle size increase or expansion as shown in FIG. 11. Other possible examples could include atom transfer radical polymerization (ATRP), nitroxide mediated polymerization (NMP), metathesis polymerization, and other analogous living polymerization methods that support ring-expansion or polyhomologation (with boracyclanes for example). A RAFT macroinitiator that has been formed by coupling two end-groups of the supramolecular template and the two end-groups of a thio-ester RAFT-CTA is shown in FIG. 12. Such design can be followed in any of the above mentioned living polymerization or ring expansion polymerization mechanism. A macroinitiator template can also be prepared which has telechelic arms. In this case, the polymerization may be made to graft a polymer chain from the template (like arms) and then followed by a coupling reaction of end groups to close the ring as exhibited in FIG. 13. In all these figures, spheres represent the macroinitiator group and the squares the end groups or connected end groups of the telechelic.

Living or RAFT Polymerization

The templates are utilized for living or living radical RAFT polymer synthesis towards control of parameters: degree of polymerization (molecular weight), polydispersity, regiospecificity, homopolymer to block-copolymer composition, branching, and side-group functionality connected to the main-chain. In general, the result is a macrocycle or macropolycycles that have been prepared by ring expansion and living polymerization which can be differentiated from more commonly prepared linear polymers. This can also be differentiated from the more commonly reported statistical ring closure of end-groups of preformed and connected polymers to form macrocycles. Thus a variation is that the macroinitiator template with open-chain telechelic end-groups: which can be made by graft polymer chains from the macroinitiator template (extending arms) then followed by a coupling reaction of end groups to close the ring as exhibited in FIG. 13.

Controlled Chain Entanglement

The supramolecular ordering of the original templates are then "loosened or decomplexed (demetalated)" to result in various interconnected macromolecular [n]-catenanes and degrees of "knottiness" or chain entanglement. The difference from the more commonly prepared supramolecularly assembled catenanes is that the higher molecular weight macromolecule is prepared by a ring expansion mechanism or by living polymerization from the initiator attached to the template followed by ring closure.

Macromolecular Properties

Characterization of the chemical structures and macromolecular properties: Molecular Weight, polydispersity, hydrodynamic volume, chain entanglement, thermo-mechanical and rheological properties, phase separation. Differences with the properties of linear analogs of the same molecular weight are expected.

Collaboration: Theory, Simulation, and Applications

Correlation with studies on macromolecular chain dynamics, simulations, and Knot Theory model chain entanglement. Explore applications: analogs of linear polymers, model polymers, rheology modifiers, lubricants, colloidal particles, etc. It should be possible to investigate these properties by simulation and test the applications empirically only if real and large amounts of sample are available. In principle, the knottiness of the macropolycycles can be programmed based on the design of the supramolecularly templated macroinitiator.

4.1 Methodology

The concepts and paradigms of Knot Theory guides the design of specific molecular and supramolecular templates providing rational precursors for new molecular topologies of macrocycles and macropolycycles. The main challenge is on controlled knot formation via in-situ living-radical polymerization in a ring insertion polymerization (RIP) or ring-expansion polymerization (REP) RAFT process. In general, supramolecularly assembled iniferters for RAFT polymerization is an area that has remained largely unexplored in macromolecular synthesis. In this manner, intricately ordered supramolecular assemblies previously developed in small molecules can be creatively used to synthesize new large macromolecular structures of high value for polymer theory, de novo polymer synthesis, and practical industrial applications for knotty polymers.

4.1.1 Macroinitiator (Iniferter) Templates

Figure 14:
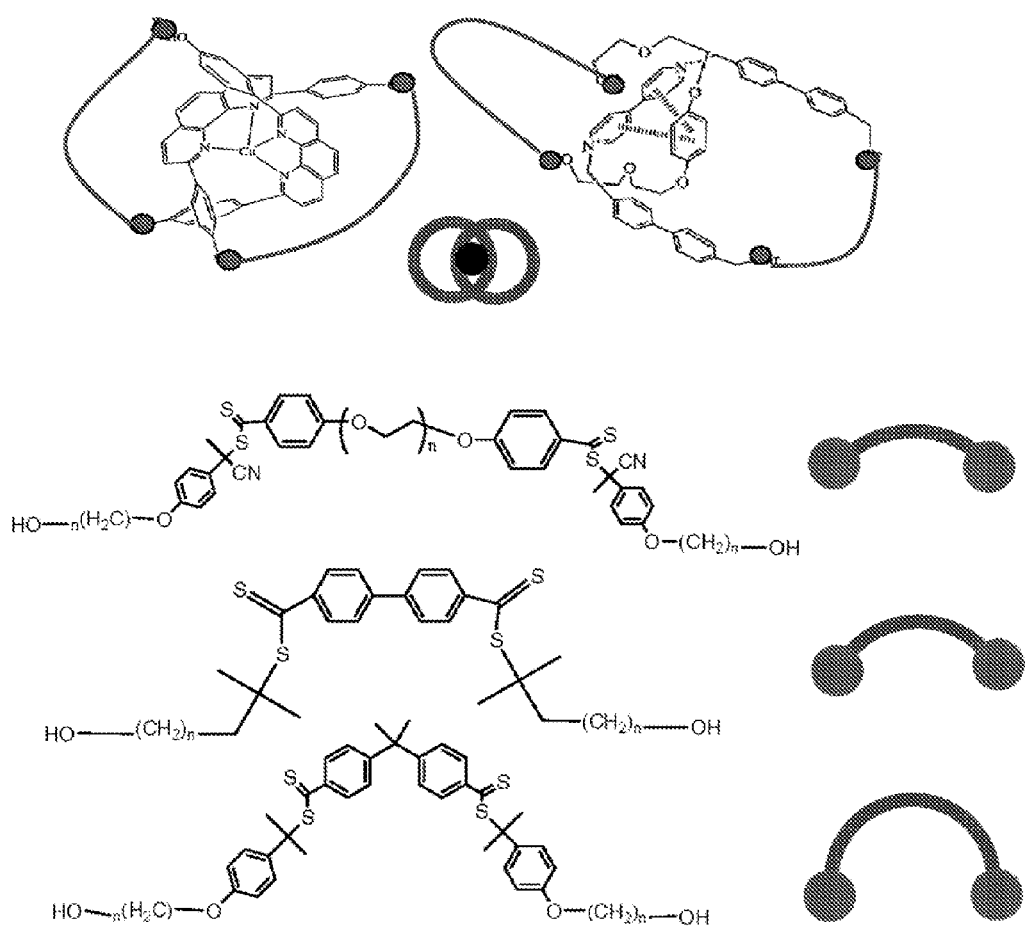
FIG. 14 depicts chemical templates and corresponding symmetrical iniferters.

Various chemical templates or knot precursors are synthesized based on molecular knots, complexes, catenates, and catenands. Well-reported interlocked molecular structures based on metal ion templates, hydrogen bonded templates, cyclodextrin templates, and p-donor-p-acceptor templates. This involves the capping of these complexes with difunctional symmetrical iniferters as illustrated in FIG. 14. The first system to be studied uses Sauvage's phenanthroline templates: 2,9-bis(p-hydroxyphenyl)-1,10-phenanthroline. The structure is built around a tetrahedral Cu(I) ion metal complex in which the phenanthroline units will be mutually perpendicular. Two routes are possible: (1) a two-turn approach or (2) a ring-turn approach. The only apparent weakness of strategy 1 is that a total of eight reaction points have to find one another in the double-cyclization reaction. The second strategy 2 reduces this problem, since it involves only four reacting groups to be interconnected in a single cyclization. In general, for interlocking turns, choosing and locating the terminal functional groups so that no additional linking atoms (or a minimum number) are required to complete the ring greatly facilitates the efficiency of catenane formation. It is also possible to synthesize H-bonding anchors for templates which generally involve multicentric interactions, e.g., pyrimidine and purine bases or H-bonding (donor-acceptor) pairs. There are many other examples which include Busch: Stoddart secondary ammonium ion anchors and the Hunter:

Vogtle:Leigh diamide templates. For example, the Stoddart template as shown in FIG. 14 is formed between electron rich aromatic ether moieties and paraquat-containing moieties, as p-donor:p-acceptor templates. Other octahedral complexes based on Ru can be synthesized.

Iniferter Cap Synthesis

Figure 15:
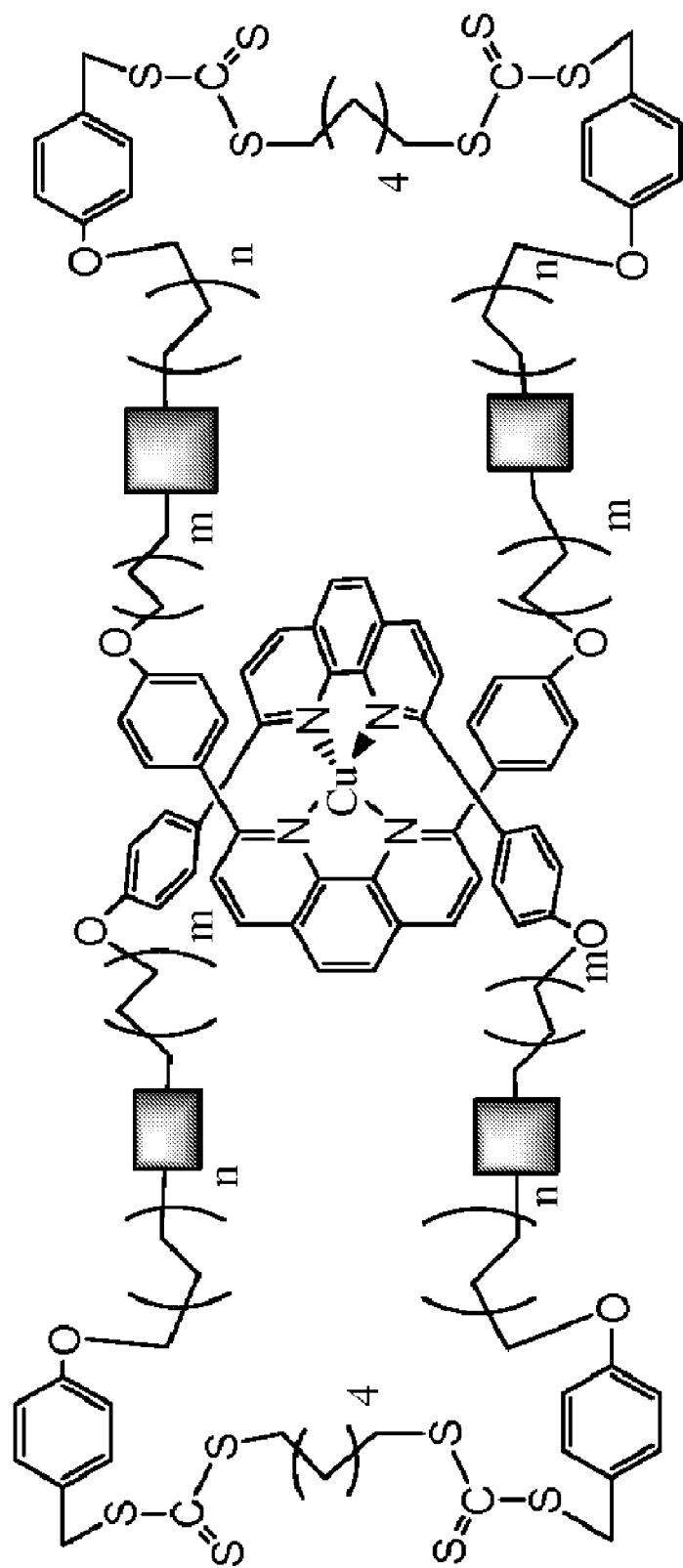
FIG. 15 depicts an embodiment of an R-anchored initiator of this invention.
Figure 16:
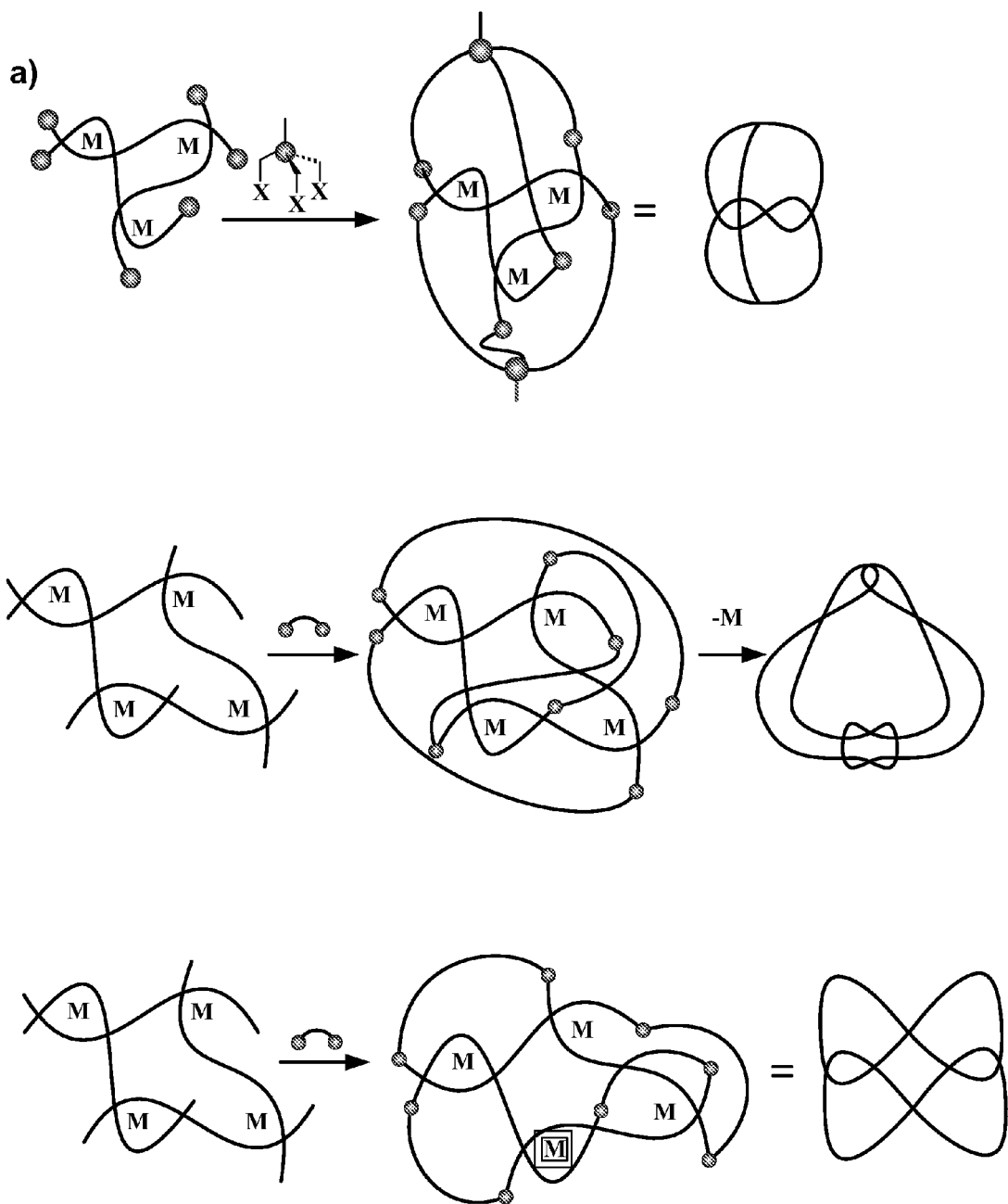
FIG. 16 depicts a difunctional and tri-functional iniferter cap on bridging supramolecular multi-metal complex templates.

A complementary effort is made on the iniferter component based mainly on dithioesters, which are unsurpassed in activity by xanthates, trithiocarbonates and thiocarbamates. Initially, the focus is on aromatic dithioesters that contain the dithiobenzoate moiety. Various reaction schemes can incorporate different Z and R groups to control the activating and leaving groups of the RAFT agent, respectively. This involves both simple etherification and esterification schemes to provide for a symmetrical dithioesters iniferters with appropriate spacers to control the size of the loop. The right position of the dithioesters is such that the propagating end goes further away from the template as the monomer insertion occurs to allow for better monomer access by diffusion. This is termed as an R-anchored initiator as shown in FIG. 15 as opposed to a Z-anchored initiator as shown in FIG. 12. The design includes bi-functional, tri-functional iniferters to cap the chemical templates, resulting in various interesting knot geometries as shown in FIG. 16.

Statistical products are isolated by preparative chromatography as individual fractions and analyzed to determine the final yield. A model mono-functional iniferter may be utilized to demonstrate the importance of monomer access in the ring insertion polymerization. Structure-property relationships can be investigated with respect to these various parameters for optimizing the ring expansion or ring-insertion polymerization. Such parameters include: monomer diffusion, radical stability, conformation restriction, and various solvent cage effects (polarity of solvent). One can create various template complexities that lead to more complex knots. For example, with the Sauvage approach, the extension of a helical approach to larger linear array of complexed copper ions can result in some interesting direction in which even numbers of cross-overs (i.e. tetrahedral copper(I) plus pairs of turns) always produces increasingly complex knots, while odd numbers of cross-overs lead to increasingly complex multiply interlocked [2]-catenanes as shown in FIG. 16. Composite knots can be prepared by linking two or more simpler knots. According to theory, a composite knot can be formed when the cord of a single knot is cut and the two free ends are joined to those of a second severed knot, producing a large knot that is composed of smaller, simpler knots. It is possible to have complex knot templates that are yet to be reported: convergent and divergent turns with respect to the anchor as with asymmetric reactivity. Different stereoisomer elements can also be observed. Molecular weaving and rack type complexes can be applied. One can optimize the structures of the templates towards high yield based on manipulating the turns or creating well-designed macrocyclic structures: by applying the principle of least reagents or ring-turn approach.

Figure 17:
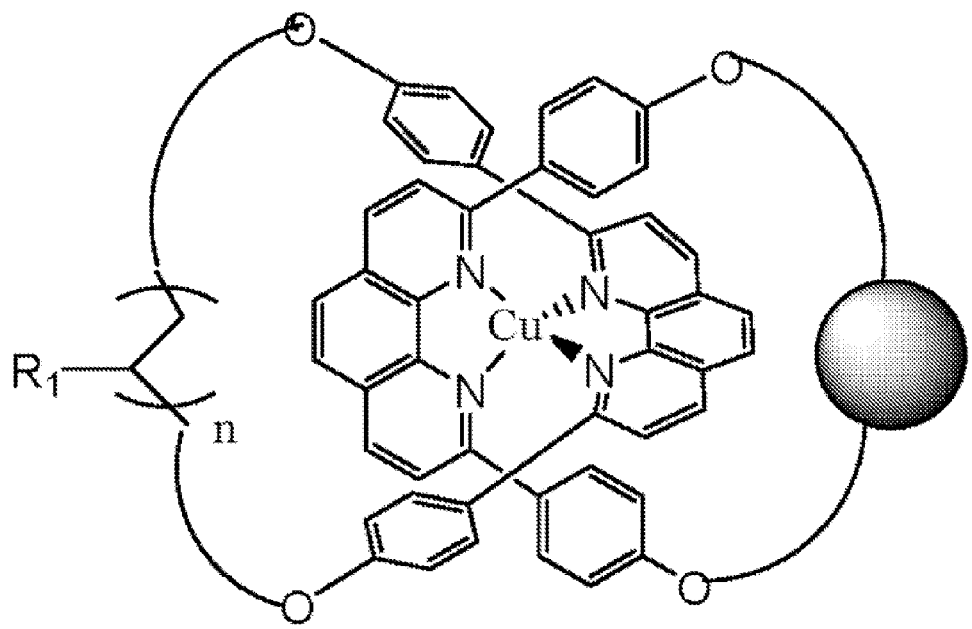
FIG. 17 depicts an embodiment of another macrocycle of this invention.
Figure 18:
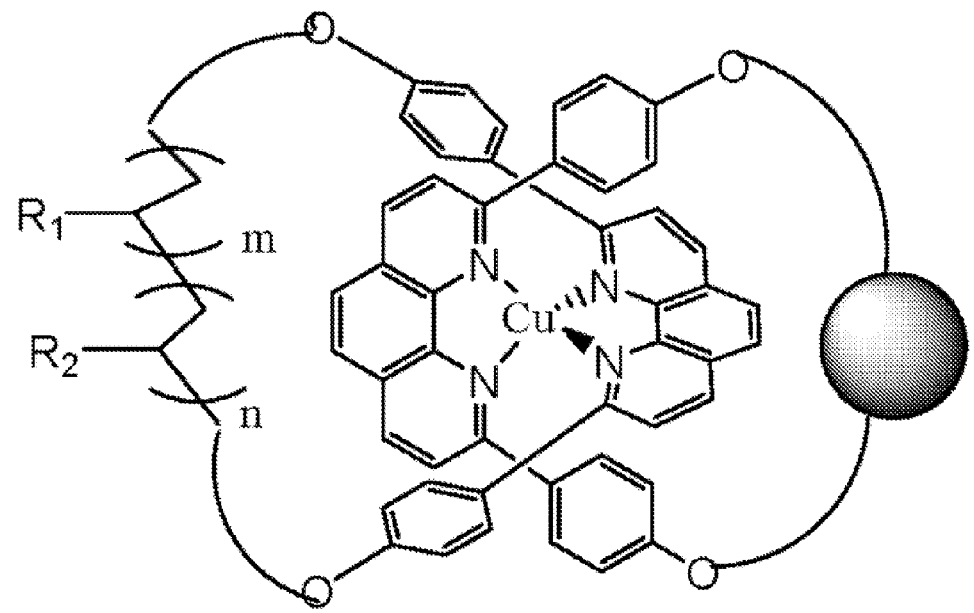
FIG. 18 depicts an embodiment of another macrocycle of this invention.
Figure 19:
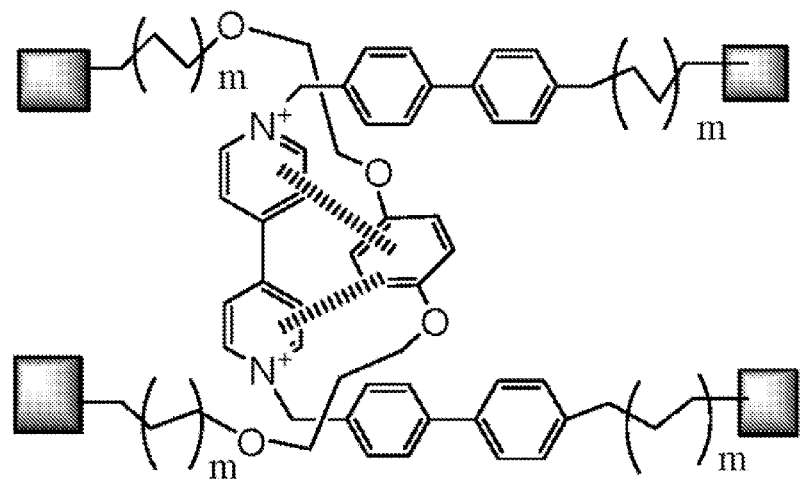
FIG. 19 depicts an embodiment of another template of this invention.
Figure 20:
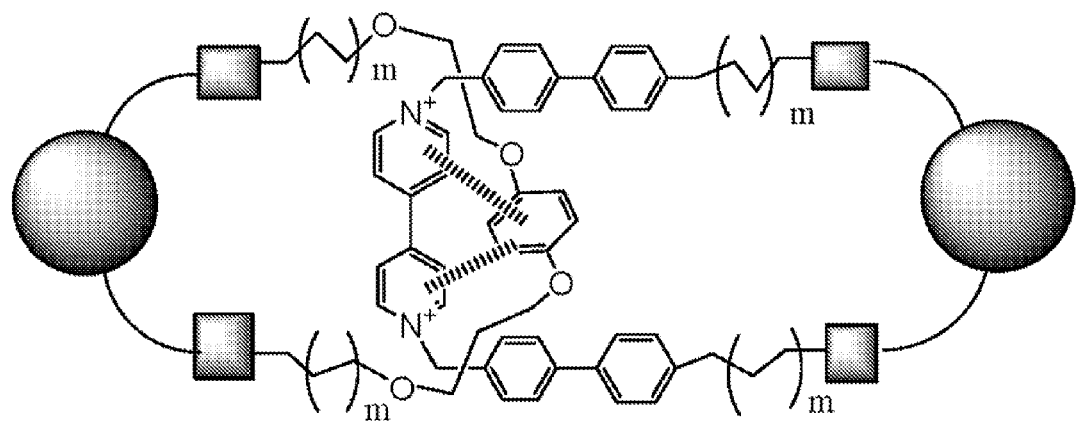
FIG. 20 depicts an embodiment of a macrocycle prepared using the template of FIG. 19.
Figure 21:
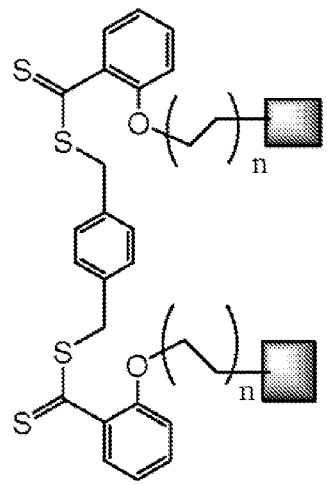
FIG. 21 depicts an embodiment of a ring closure agent of this invention.
Figure 22:
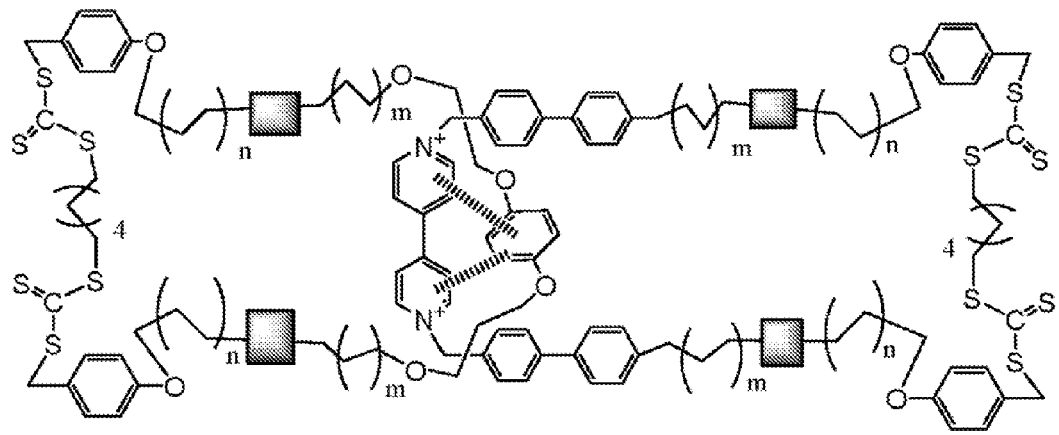
FIG. 22 depicts an embodiment of a specific macrocycle prepared using the template of FIG. 19.
Figure 23:
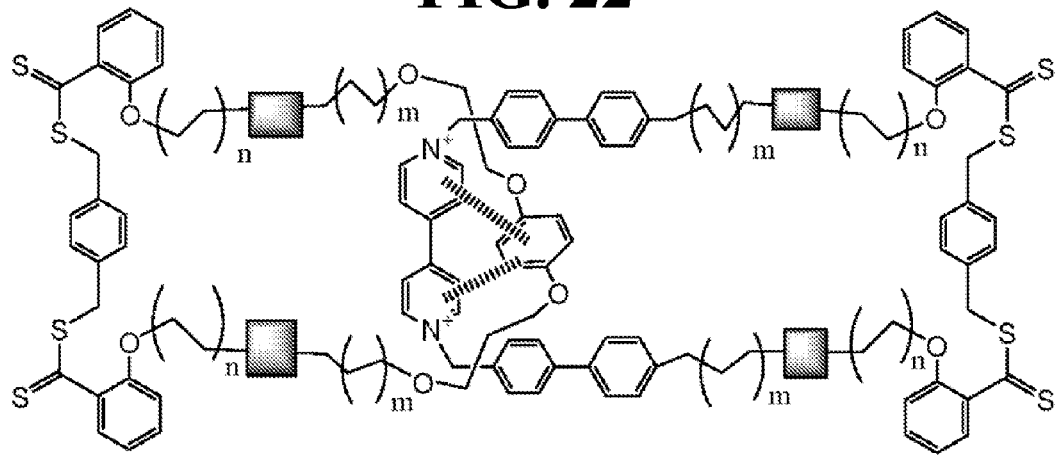
FIG. 23 depicts an embodiment of another specific macrocycle prepared using the template of FIG. 19.

Another variation of this design is the incorporation of an already synthesized homopolymer as shown in FIG. 17 or block copolymer as shown in FIG. 18 that have been previously prepared by other living polymerization methods in which the end-group is coupled to the end groups of the supramolecular template, which has one side still capable of ring expansion polymerization. Another variation of this design involves the Stoddart template which is formed between electron rich aromatic ether moieties and paraquat-containing moieties, as p-donor:p-acceptor templates utilizing an iniferter cap as shown in FIG. 19, a paraquat-containing complex as shown in FIG. 20, and ring closure to form the macroinitiator with a general structure as shown in FIG. 21. Two examples of these assembled and capped structures are shown in FIG. 22 and FIG. 23. In all these figures, spheres represent the macroinitiator group and the squares the end groups or connected end groups of the telechelic. In general, the design of these important templates include, but are not limited to, ion-ligand complexation, p-p stacking, ion-dipole attractions and hydrogen bonding interactions, which combine to force molecular strands into turns and eventually ring closure.

4.1.2 RAFT Polymerization

Figure 24:
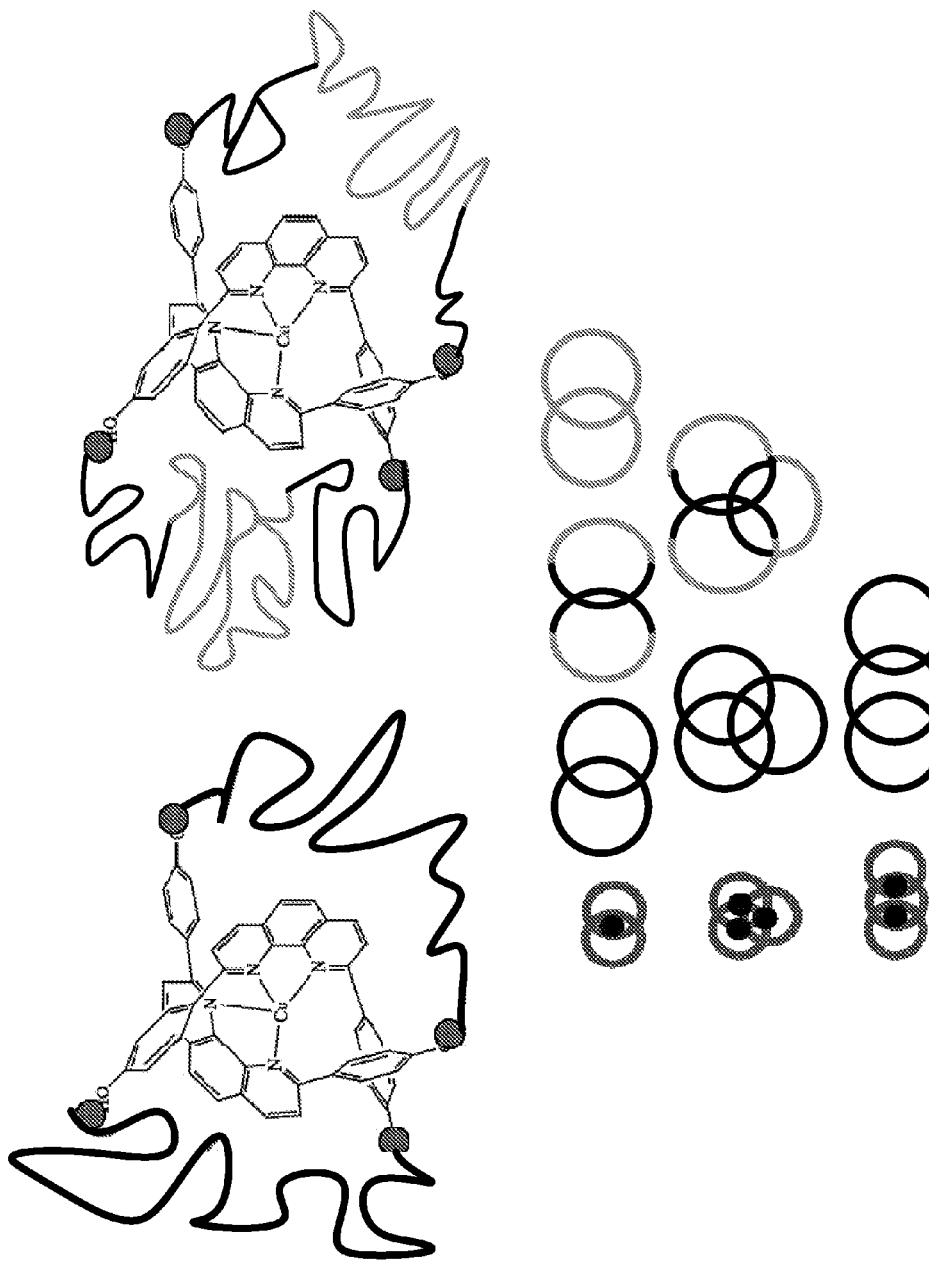
FIG. 24 depicts homopolymer and block copolymer architectures from various catenane complex precursors and monomers.

Various polymers of interest are investigated with initial work being done mostly on methacrylates, acrylates, and styrene. Loop or cyclomer formation are directed through essentially a ring-insertion polymerization (RIP)—RAFT process. Depending on the polymer MW, block composition, c-interaction parameters, various loops and macrocycles are investigated—based on theoretical and possible application interest. Of interest is to obtain block copolymer catenanes in which the template allows for the insertion of two types of monomers from the symmetrical iniferter cap as illustrated in FIG. 24. Most macrocyclic polymers have only been synthesized up to now with statistical threading or end-ring closure. This design is primarily a macrocyclic polymerization by ring-expensing formation. A macroinitiator template can also be prepared which has telechelic arms. In this case the polymerization can be made to graft a polymer chain and then followed by a coupling reaction of end groups to close the ring.

Figure 13:
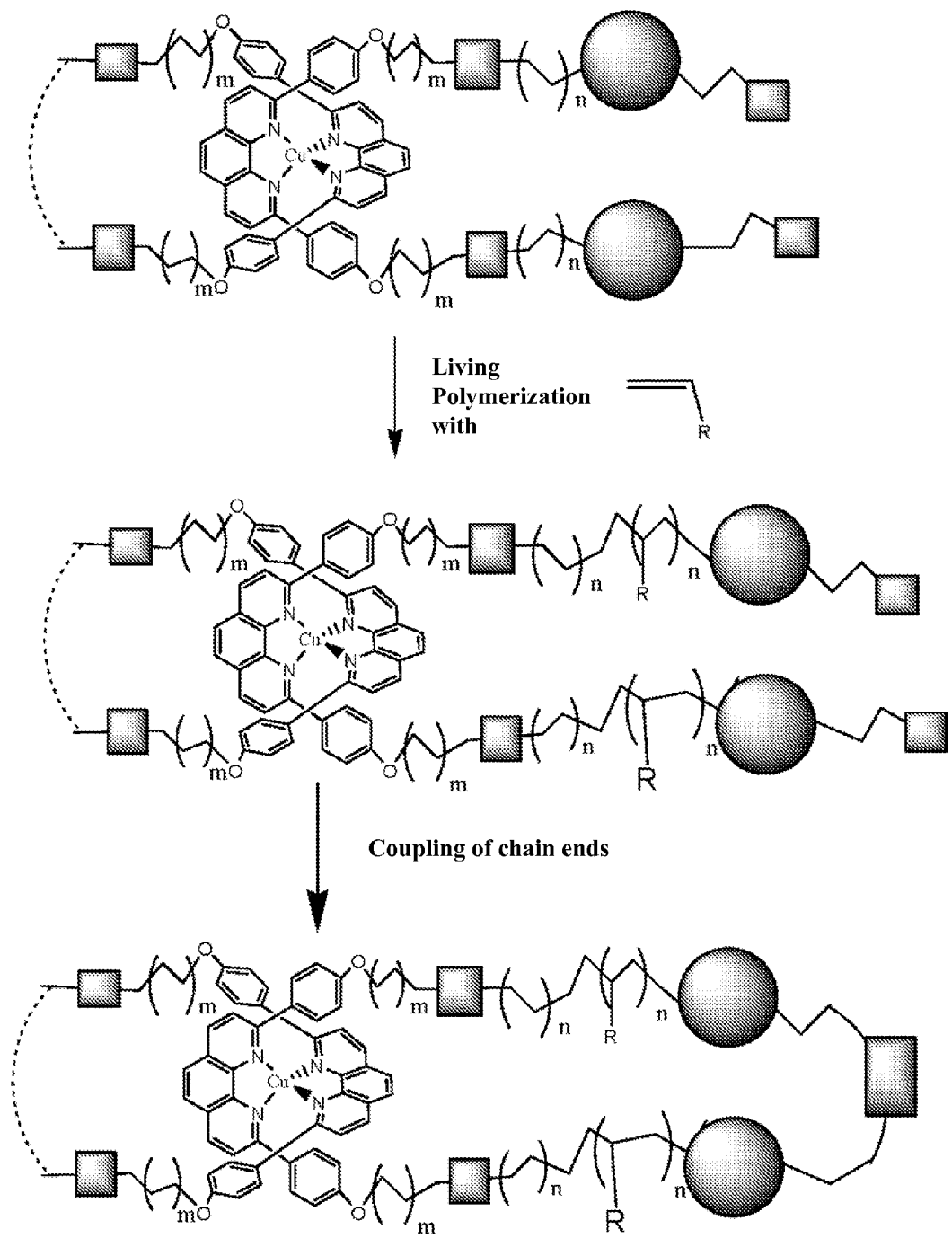
FIG. 13 depicts an embodiment of a method of this invention, where polymerization grafts a polymer chain and then a coupling reaction couples the end groups of the polymer chains to close the ring.
Figure 25:
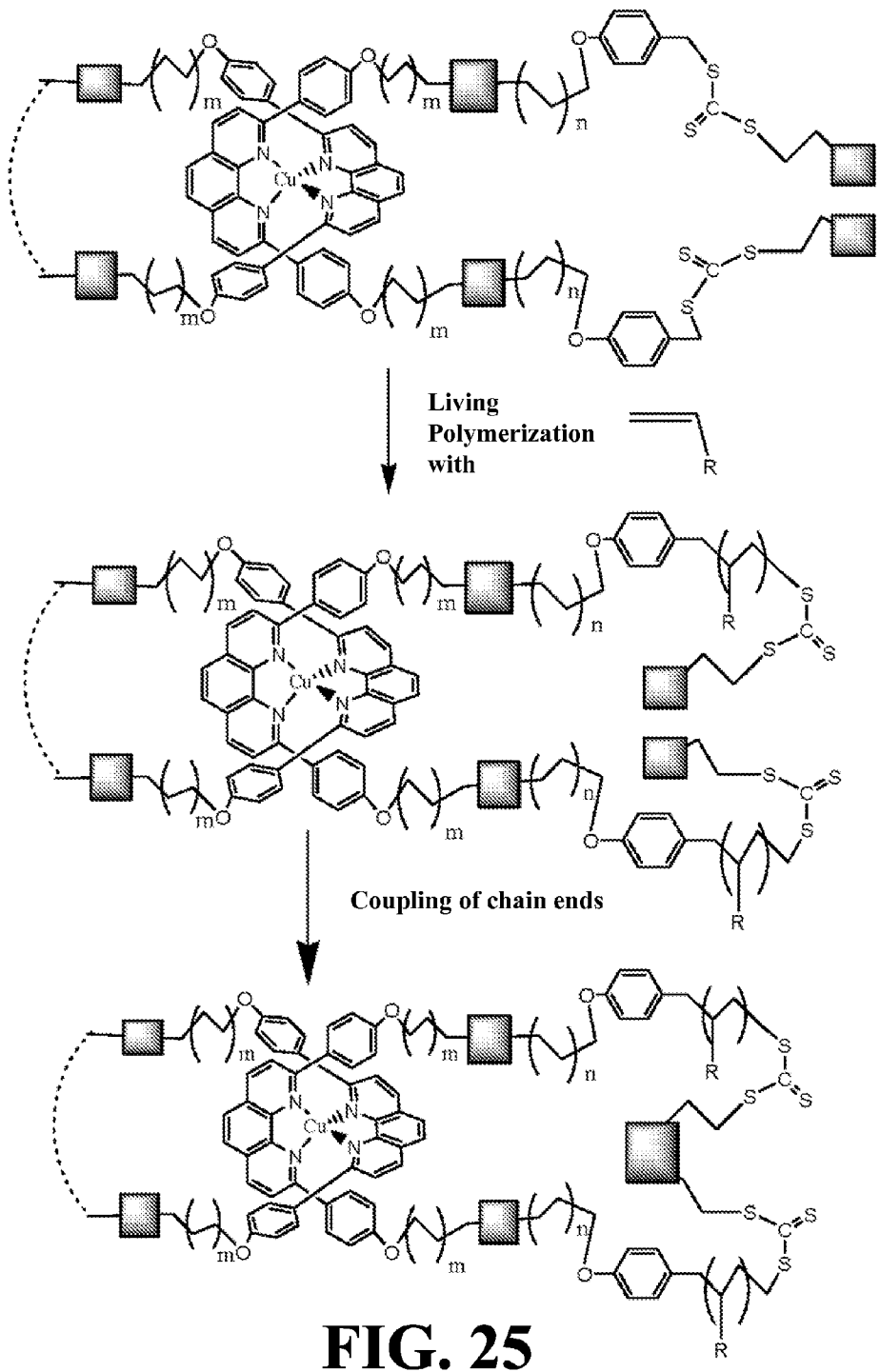
FIG. 25 depicts an embodiment of another method of this invention, where polymerization grafts a polymer chain and then a coupling reaction couples the end groups of the polymer chains to close the ring.

4.1.2.1 RAFT Polymerization vs. ATRP, NMP-TEMPO, Anionic Polymerization and Other Ring Expansion Polymerization Mechanisms While controlled living polymerization is essential, RAFT has the advantage in that it is not susceptible to ion complexation as with ATRP. It is easier to synthesize in ambient conditions and works on various solvents compared to anionic polymerization. NMP or TEMPO, which requires higher temperatures, may be detrimental to the stability of the radical equilibrium, ion and H-bonded chemical template complexes. It should be possible to access ring-opening metathesis polymerization (ROMP), ring-opening polymerization of lactides, lactones, and lactams, and other ring expansion polymerization mechanisms as long as they do not interfere with the stability of the metal-ligand template. One variation of the polymerization that achieves the same goal but not necessarily by ring expansion polymerization is shown in FIG. 25, which shows the use of an open-end macroinitiator in which the RAFT-CTA is part of the template but has open-ends at the Z-group. The polymerization can take place on the RAFT-CTA to grow the polymer chain. This will then be followed by ring closure of the two end-groups after the polymer has been grown. In this case, the template is preserved but the ring is formed involving an "analogous" linear living mechanism with telechelic end-groups that are later closed. This is a variation on the last step of the method but applies the principles of the programmed macroinitiator template. A more generalized scheme where the sphere represents any macroinitiator or catalyst group and the squares as chain ends or coupled chain ends as depicted in FIG. 13.

4.1.2.1 Block Copolymerization is Highly Accessible

Of particular interest are the control of polymerizability for various monomers and the possibility of phase-separated knotty polymers, which may be addressed by copolymerizing two polymers with different c-interaction parameters. By design of a symmetrical iniferter, a triblock is formed, e.g., PMMA-PS-PMMA. There are several pathways for a radical in RAFT as shown in FIG. 26: (a) Iniferter AB dissociates thermally or photochemically, forming a reactive radical A• and a stable radical B•; (b) A• initiates polymerization; (c) Propagation of A• initiated polymerization can be deactivated by coupling with B, which is a reversible process; (d) Transfer to iniferter AB to generate B capped A oligomer/polymer; and (e) transfer to a dormant B capped A oligomer/polymer. Other possible reactions may occur depending on the structure of the iniferter. Besides, the above mention reaction pathways, as is true in any free radical process, bimolecular termination can takes place (f) by combination or disproportionation. The parameters that enable chain propagation or ring expansion through RIP-RAFT are carefully explored. The parameters includes: (1) low concentrations, (2) good solubility for both iniferter complex and polymer, and (3) ratio of iniferter: monomer. Block copolymers are a challenge that is of high interest for optimization. It is important that the transfer is fast compared to propagation, i.e., the radical is exchanged rapidly among the chains. If all chains have an equal chance to add monomer, then all will grow at the same rate. To obtain a low polydispersity or uniform loop length, it is also important that all chains start growing at the same time, namely the onset of the reaction. Therefore the initial transformation from RAFT agent to dormant polymer species needs to be rapid. A constant number of chains throughout the reaction is important as both chains that cease to grow as well as chains that start growing later during the polymerization would have chain lengths significantly different. The concentration of polymer loops at the beginning of the reaction is equal to the initial concentration of RAFT agent, assuming rapid transformation of the RAFT agent into dormant polymer chains. The number of monomer units taken up during each cycle in the iniferter process is studied with respect to its polydispersities and loop integrity. The RAFT process is complicated by a relative low activity of B as a deactivator and side reactions may occur, causing the dormant polymer chain to split up in an alternative way, thereby irreversibly destroying the counterradical. It should be noted that maintaining loop integrity even if varying sizes are obtained is still a favorable outcome in a RIP-RAFT process for knot formation. While the process described here is specific for RAFT, different requirements for optimized metathesis polymerization, ATRP, NMP, group transfer polymerization, metal coordination polymerization, and other polyhomologation reactions should take into account the requirements for achieving living or near living polymerization while preserving the structure of the template.

4.1.3 Characterization

Macromolecular, chemical structure, physico-chemical characterization is of high importance: 1) the chemical structure of the chemical templates are investigated by NMR, Mass-Spectroscopy, elemental analysis. The complexation to form the templates are investigated by UV-vis, Fluorescence, and NMR. A wide range of solubility of the templates in organic solvents is important. The yield of the complex is optimized for a ring-turn or two-turn strategy. Statistical products are isolated by preparative chromatography as individual fractions and analyzed to determine the final yield. The templates are then used for RIP-RAFT resulting in tethered loop structures (no end-group). Two distinguishable steps are compared and analyzed: a) as synthesized and b) after demetalation of the complex. The polymer chemical structure is characterized by NMR, IR and elemental analysis. The macromolecular properties such as MW, polydispersity, hydrodynamic volume are characterized by gel permeation chromatography (GPC), Light Scattering, and MALDI. Thermo-mechanical properties are investigated by DSC, TGA, DMA, including rheology (rheometer). These macromolecules should reveal properties that are unique compared to linear or random entangled polymers with end-groups. It should be noted that the polymers obtained here can serve as model polymers compared to those obtained from statistical threading between good and poor solvent conditions in telechelic polymers or in controlled crosslinking studies. It is important to determine the success of the controlled RIP-RAFT process in terms of polydispersity and living nature not to mention the integrity of the loop. In particular, the macromolecules are carefully investigated in terms of 1) uniformity of loop formation, 2) absence of end-groups, and 3) presence of free side products. Degrafting strategies of the formed polymers is utilized if needed including preparative GPC to separate the fragments and loops according to size. This enables a detailed mechanistic study of the RIP-RAFT process as compared to linear-RAFT. To highlight the importance of monomer diffusion, it is possible to use model chemical templates, e.g., mono-functional iniferters that prefer to grow only on one side or the use of terminal iniferters (non-loop) along with the looped iniferters. A sacrificial initiator iniferter can be included to investigate the rates of monomer diffusion between the templated and free iniferters in the same media. The results are correlated to the predicted properties by Knot Theory and Chain dynamics (entanglement). Synthetically, unique block copolymers are interesting and can pose a challenge in characterization. While block copolymer work on free RAFT iniferters have been widely reported, these systems can have inherent constraints because of the proximity of the dithioesters or the influence of the template structures. Comparison can be made with RAFT polymerization on dendrimeric, star, or surface polymerization and other space or phase-confined polymerization systems. The block copolymers can result in phase separation, which may form morphologies that are unique as compared to linear diblock and tri-blocks. It is possible to use TEM, scattering, and diffraction methods to compare equilibrium morphologies (annealed) of these materials as thin films. The colloidal and interfacial solution properties of these materials in various solvents are studied as a function of molecular weight or block copolymer compositions. Amphiphilic systems can be created, where one ring is hydrophobic and the other hydrophilic or ionic. LS, TEM, SAXS, and zeta potential measurements are among key characterization methods. AFM can be used to investigate individual ring structures by spin-casting very dilute solutions on mica or graphite. It is possible to observed new and unique properties not accessible by dendrimeric routes, star copolymers or conventional emulsion particle synthesis. By focusing on the rheological properties (rheometry) new practical industrial applications are expected, e.g., viscosity modifiers, lubricants, compatibilizers, etc. The reason is that these systems are inherently tethered and entangled with no chain end-groups. Viscoelastic properties also vary with molecular weight and composition, which can be compared with linear analogs. The study of time-temperature dependent properties is of high interest.

4.1.4 Theory, Modeling, and Simulation

Figure 27:
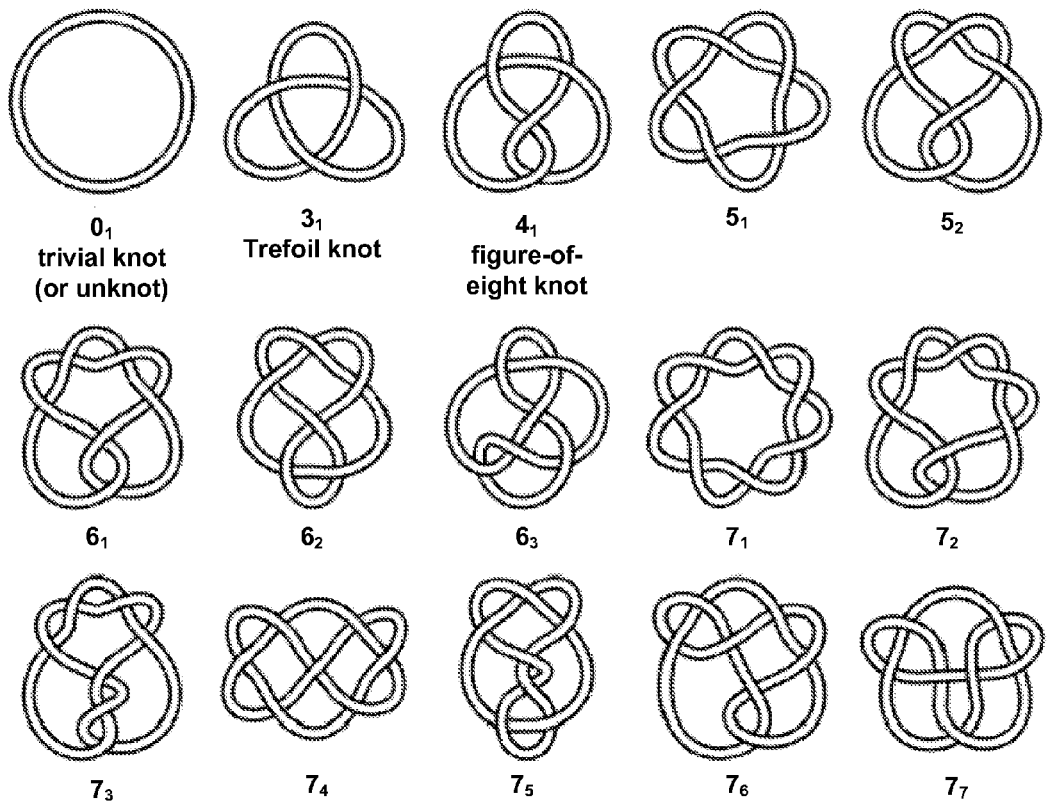
FIG. 27 depicts tabulations of knots with low crossing number n, so-called prime knots.
Figure 27:
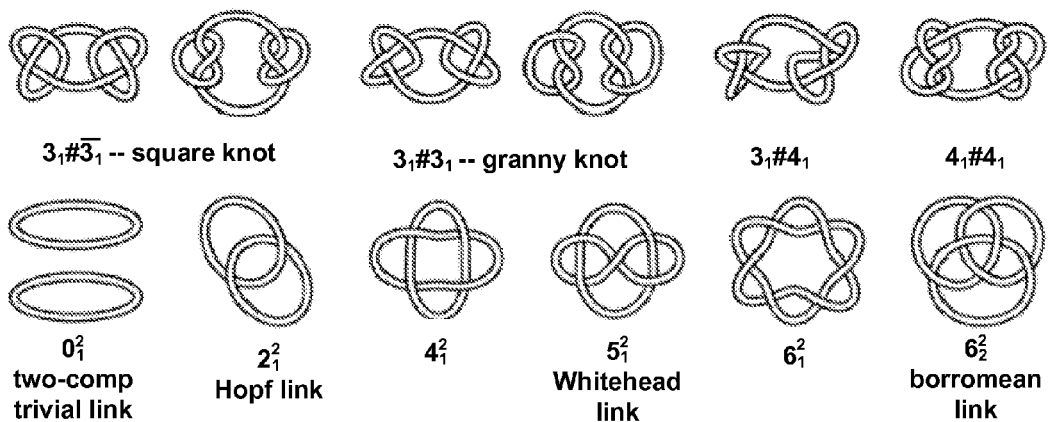
Figure 28:
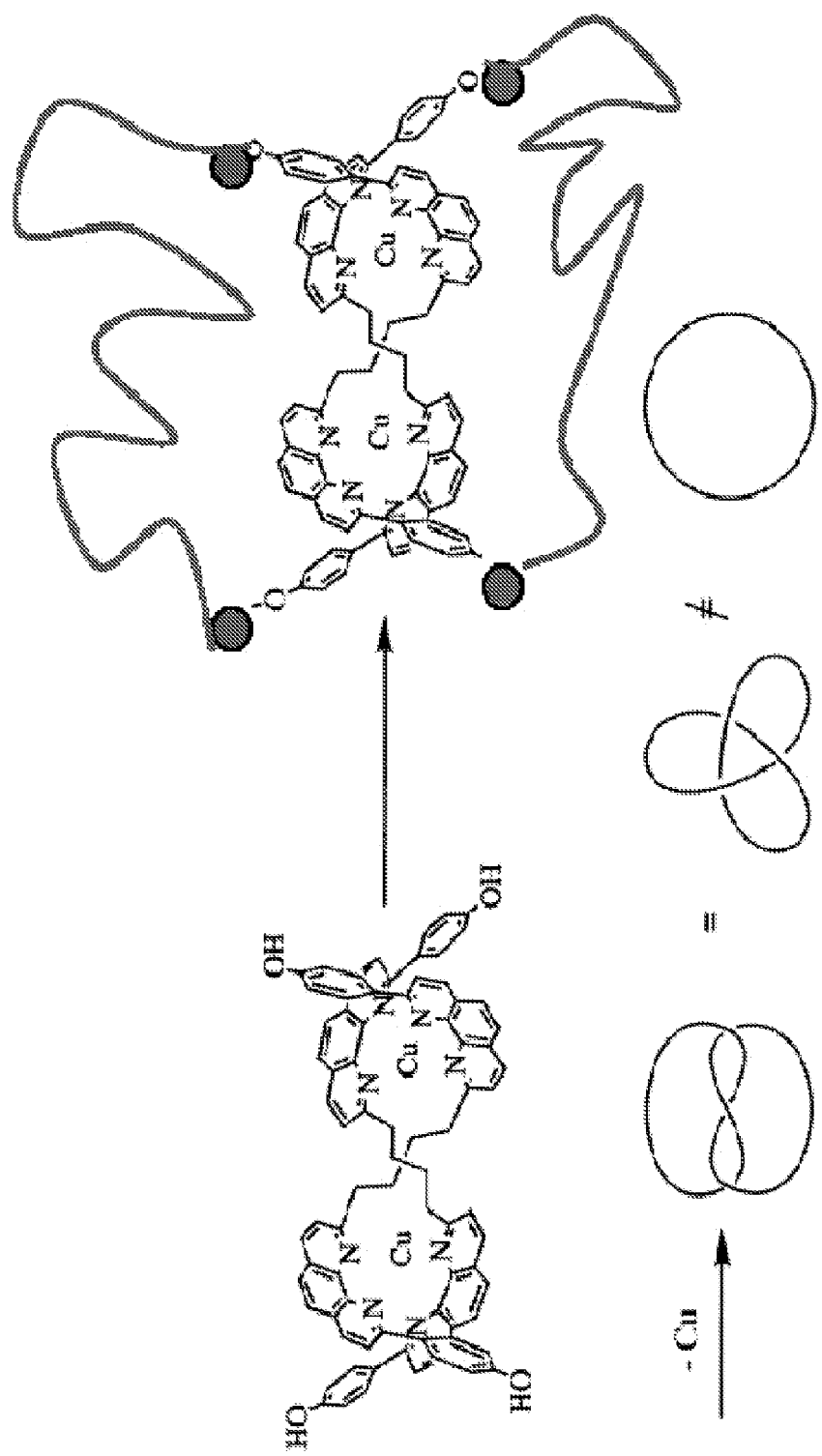
FIG. 28 depicts a synthesis of a treafoil knot and its simulation is basic concept in Knot Theory.

Through this approach, synthetically model chain entangled polymers can be accessed. This allows for modeling and simulation of various knots (or entanglements), macrocycles, and macropolycycles of well-studied PMMA, PS, and other polyolefins. Of primary interest is accessing the first set of mathematically and topologically interesting knots as shown in FIGS. 27 and 28. Tabulations of knots with a low crossing number n, so-called prime knots $n_k$, is prepared (k is just a counting index, for all prime knots $n_k$ with 3<n<7). Prime knots may be combined to form more complicated objects, known as composite knots, $n_k \# m_l$, or 1-component links. Knot theory is a well-developed branch of topology, largely devoted to the classification of knots and the search for so-called knot invariants. The latter allows one to decide, more or less easily, whether two given knots are identical (and thus interconvertible) or not. Although knots in polymers have been studied for decades, they remain perhaps one of the least understood in polymer physics in part due to lack of experimental data from model polymers. Most of the work in this area has been directed at classification of knots, finding efficient topological invariants, and the probabilistic questions, e.g., "What is the probability of obtaining a certain knot type under given conditions (e.g., on loop closure)?" Much less is known about the more physical aspects, which are how knots influence the properties of polymers. The simplest question to ask about physical properties is what the average spatial size is of a polymer loop whose knot type is quenched? To this end, des Cloizeaux conjectured as early as 1981 that the size of a trivially knotted loop (i.e., an unknot) scales with the number of segments N, in the same way as in the case of a self-avoiding walk, which is $N^n$, where $n=n_{SAW}\sim 0.589$ or $3/5$. Of particular interest is to find out if the topological constraints have a marginal effect on the loop size in relation to the characteristic length of random knotting. In other words, what N, for trivial and non-trivial knots is there a crossover to the scaling regime of Rg as observed similarly in self-avoiding walks statistics. In terms of excluded volume, it is interesting to determine if topologically complex loops are likely to adopt either strongly collapsed or strongly expanded configurations. It should be possible to undertake simulation studies of the average size of trivially knotted polymer loops with no excluded volume. The probability of a trivial knot, average gyration radius, and probability density distributions as functions of gyration radius can be generated for loops of various N segments. In this way, it can be determined if the gyration radii of trivially and non-trivially knotted loops follow a power law similar to that of self-avoiding walks consistent with earlier theoretical predictions. Although there are connections between knot invariants and various models in statistical mechanics, knot invariants are algebraic quantities and are difficult to treat analytically. A crude phenomenological model of the effects of knot complexity on the static and dynamic properties of knots is possible. The reptation tube model may be successful because it relates topological effects to geometry, making the problem tractable to analysis. Thus, it should be possible to explore the use of statistical mechanics to knots, which essentially convert the topological constraints into geometric constraints. Predictions of the scaling exponents of the radius of gyration and relaxation time should be possible using Monte Carlo simulations. The dynamics of a fixed length polymer is simulated to study the relationship between topology and relaxation time.

Figure 29:
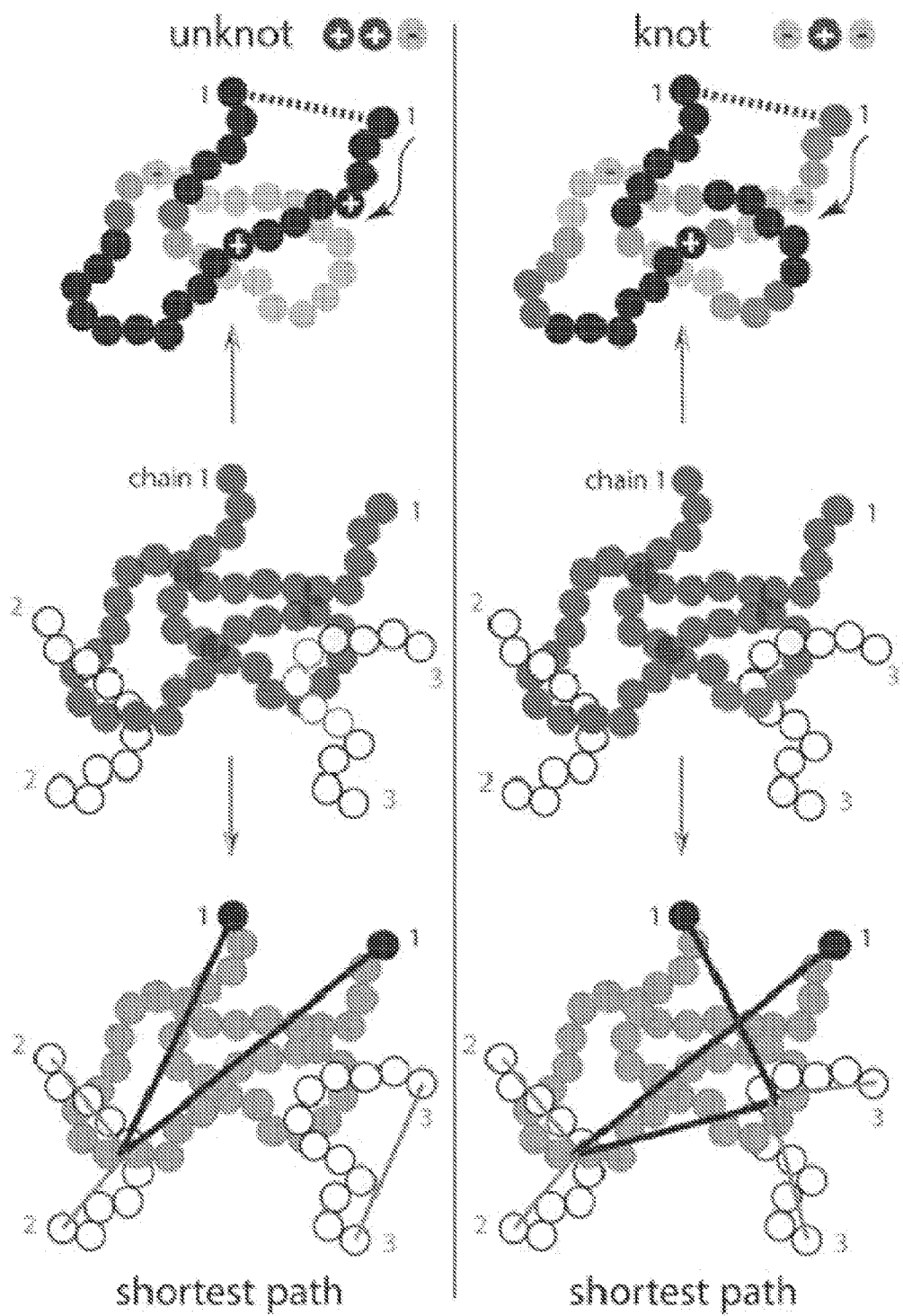
FIG. 29 depicts simulation studies by a knotting algorithm highlighting the different configurational information giving rise to knotting and entanglement.

Recently, numerical simulations have been used to investigate how the chain length and topology of freely fluctuating knotted polymer rings affect their various spatial characteristics such as the radius of the smallest sphere enclosing momentary configurations of simulated polymer chains as shown in FIG. 29. If the correlation is successful, interesting new systems can be modeled and experimentally verified: (1) Phase separation of macrocycles among individual chains, (2) model chain entanglement-disentanglement kinetics in monodispersed macrocycle systems, and (3) new macrocycle and macropolycycle chain dynamics. This enables fundamental studies and correlation to solution and viscosity properties of a high variety of catenane macromolecular systems that has so far been largely limited to statistically threaded macrocycles from telechelics. Different macrocycles composition (c-parameter) can be combined or linked leading to controlled phase separation. Controlled knotting of polymers influence chain dimensions and hydrodynamic properties. There are many questions that can be addressed with correlation of simulation and experimental date. These results are useful to calculate knot mobility and compare it to experimental gel electrophoresis data of randomly entangled vs model entangled polymers. The average radius of gyration is explored as simply a new knot invariant. There are questions about the effects of knots on polymer elasticity and other thermo-mechanical properties that can be simulated and experimentally verified. From a theoretical point of view, molecular knots, links, and fabrics once formed are expected to exist in many more cases than have been previously reported up to now. Most aspects of this work can be done through collaborations, while this project focuses primarily on optimizing high yield synthesis and materials characterization. Various polymer knots and compositions can then be made by demand.

4.1.5 Applications

While the ability to synthesize model knot polymers have been highlighted in this present invention, the results of this project can potentially impact knowledge and applications on macromolecular solutions, viscosities, and solubilities currently dominated by linear polymer systems. The investigation of new properties and paradigms that can be derived from highly controlled entangled polymers of various sizes and composition—as compared to randomly entangled or pressure-volume-temperature (PVT) induced polymer entanglement properties will be made possible. Thermo-mechanical properties are expected to differ considerably from its linear polymer counterparts. Blends of macrocycles with linear components may induce a combination of mechanical properties yet unrealized. Other possible applications can include compatibilizers, lubricants, surfactants, and colloidal particles. The central question will be "what superior properties can be derived from knotted versus linear polymer chains?" in various applications. Inversely, what inferior properties can be highlighted from the presence of high chain entanglement that can be modeled with these systems. Most aspects of this work can be done through collaborations while the project focuses on optimizing high yield synthesis and materials characterization.

The concept of knotty macrocycle synthesis as presented herein can be extended to other polymerization mechanisms as long as it enables polymerization that maintains the integrity of a growing cyclic ring, e.g., design of initiators and reaction conditions that allows it to be adapted to anionic, cationic, ring-opening, metathesis, group transfer, other metallocene chemistries, polyhomologation, and other living polymerization mechanisms. One of ordinary skills in the art, with the benefit of this disclosure, would recognize the extension of the approach to other types of living polymerization of polyhomologation reactions.

The concept of knotty macrocycle synthesis as presented herein may also be extended to the formation of and use of attached block copolymers and pre-formed polymers or miscible and immiscible polymer blending or mixing with other linear and macrocyclic polymers. It can also be extended to attaching the macroinitiator template to preformed natural polymers, bio-polymers, synthetic polymers, block-copolymers, dendrimers, or any other macromolecule in which the growth of "new polymer" chain or ring is only limited to the initiator that is attached to the macroinitiator template. One of ordinary skills in the art, with the benefit of this disclosure, would recognize the extension of the approach to other types of grafted structures to existing polymers and blending practices.

The concept of knotty macrocycle synthesis as presented herein may also be extended to the formation of and use in network or crosslinking with linear and macrocyclic polymers. This can be extended to any "post-polymerization" chemistry, functional group chemistry, or reactions in general (polymer analogous reactions) after the polymerization has taken place from the template. One of ordinary skills in the art, with the benefit of this disclosure, would recognize the extension of the approach to other types of post-polymerization reactions or polymer analogous reactions.

The concept of knotty macrocycle synthesis as presented herein may also be extended to the formation of and use in composite and nanocomposite formation with filler, particle, and nano-particle materials. In this case, the template macro-initiator is attached or associated with the particle where the polymerization then takes place. It can also include reactive blending or polymerization within a blend with the particle. One of ordinary skills in the art, with the benefit of this disclosure, would recognize the extension of the approach to other types composite, nanocomposites, and surface initiated polymerizations.

While the invention described here specifically focuses on the design, synthesis, and use of certain types of molecules to produce knotty polymers, one of ordinary skills in the art, with the benefit of this disclosure, would recognize the extension of the approach to other class of molecules, including, but not limited to, any linear, branched, graft, comb, mikto-arm, kyklo-telechelics, hyperbranched, and dendritic polymers. It is also possible to see adaptations of these techniques to current methods in supramolecular assembly, ring opening polymerization, chain end-to-end coupling reactions, ring-expansion polymerization, pre-formed macroinitiators, telechelic homopolymers, electrostatic self-assembly and covalent fixation, hydrogen-bonded polymers, ionically assembled polymers, and copolymers, and other possible extensions to current macromolecular architectures or supramolecular chemistry methods.

The supramolecular templates can include organometallic complexes, metal-ligands (bidentate or multidentate), donor-acceptor systems, H-bonding systems, p-p or pi-pi interactions, ionically complexed systems, electrostatically assembled systems, and in general other reported supramolecularly assembled systems based on non-covalent interaction. The ring closure reactions can include click reactions, diacetylene formation, metathesis ring closure, electrostatic self-assembly and covalent fixation precursors, other condensation reactions, radical coupling reactions, metal mediated coupling reactions, catalyzed C—C coupling reactions, photocrosslinking, and other cycloaddition reactions and ionic or H-bonding complexation reactions. One of ordinary skills in the art, with the benefit of this disclosure, would recognize the extension of the approach to other classes of supramolecular assembly and end-group coupling reactions.

The ring expansion polymerization and living polymerization employed can include anionic polymerization, cationic polymerization, group-transfer polymerization, controlled radical polymerization, controlled living radical polymerization, ring-opening metathesis polymerization (ROMP), coordination polymerization, metallocene polymerization, metal catalyzed, organometallic catalyzed, irradiation catalyzed, polyhomologation with boracyclanes, and other ring expansion or ring opening polymerizations provided they are optimized in design and synthesis procedures. Specific examples includes RAFT, ATRP, NMP, TEMPO, and other polymerization methods that show characteristic ring expansion and living polymerization properties to result in homopolymer and copolymer compositions but preserves the structure of the macro-initiator template. One of ordinary skills in the art, with the benefit of this disclosure, would recognize the extension of the approach to other types of polymerization.

The type of polymers can include polymerization of monomers: methylene, ethylene, vinyl, acrylate, methacrylate, styrenic, acetylenic, diene, cyclodienes, cycloalkenes, cycloalkynes, monosubstituted vinyl, disubstituted vinyl and other addition polymerization monomers both living and non-living conditions. Other types of monomers capable of ring-opening: epoxides, cycloalkenes, lactides, lactams, lactones and other ring strained monomers opened up by an initiator are possible. One of ordinary skills in the art, with the benefit of this disclosure, would recognize the extension of the approach to other classes of monomers.

Experiments of the Invention

Introduction

Polymers with different types of topology play an important role in tuning macromolecular properties.[1] Various polymers with special architectures, such as star, hyperbranched, dendronized, cylindrical and cyclic have been reported.[2,3] Although numerous examples of catenanes, rotaxanes and trefoil knots with considerably low molecular weight have been reported in literatures,[4] obtaining such orderly entangled topology in case of high molecular weight polymer as well as block copolymer remains challenging due to its synthetic obstacles. Nevertheless, the concept of entanglements is an integral part of modern polymer physics, notably in the fields of rheology,[5] adhesion,[6] crystallinity,[7] surface and interfaces,[8] block copolymers,[9] and viscoelasticity.[10] Many aspects of chemical topology from DNA to stereochemical reactions have been studied.[11] These can be explained by the realm of orderly molecular entanglements of well-reported interlocked molecular and supramolecular architectures as demonstrated by Sauvage,[12] Stoddart,[13] Wasserman,[14] Busch,[15] and Walba[16]. A number of reports have demonstrated intricate sequences of steps (threadings, cross-overs, ring closings, and other linkages) in order to form complicated orderly knot entanglements.[17]

RAFT polymerization is one of the most versatile and robust techniques in the spectrum of 'living' radical polymerization methods,[18] which includes atom transfer radical polymerization (ATRP),[19] nitroxide mediated polymerization (NMP),[20] and others.[21] There are several aspects that are unique with RAFT as compared to ATRP, NMP, or anionic polymerization. While controlled living polymerization is essential, RAFT has the advantage in that it is not susceptible to ion complexation as with ATRP. It is easier to synthesize in ambient conditions and work on various solvents compared to anionic polymerization. NMP or TEMPO, which requires higher temperatures, may be detrimental to the stability of the ion and H-bonded chemical template complexes. The accessibility of RAFT polymerization to form block copolymers would also be an advantage in demonstrating control over the formation of interesting knotty copolymers with the possibility of phase separation. Because of these characteristics of RAFT polymerization, it will be the best candidate to partner with ligand templating method for the interlocked molecular structures that are demonstrated in smaller molecules. Formation of a RAFT "templated precursor" will provide a route to form knots with higher molecular weights in a controlled manner. Furthermore, knots with block copolymer composition will also be achievable with this type of process.

Since knot is an analogue of a cyclic "end-less" structure, there is a possibility of using existing methods of forming cyclic polymers, such as coupling reactions of telomers in dilute solution,[22,23] to form knots with templating method. However, incomplete cyclization or undesirable side reactions are common for this type of preparation, such that elaborate purification procedures are required to remove the acyclic contaminant. Also, it is difficult to prepare the amphiphilic cyclic block copolymers using the coupling method because the two incompatible blocks will hinder the end-to-end ring closure. To overcome these problems, recent developments in ring expansion polymerization by monomer insertion into cyclic initiator have been reported.[24,25] Herein, we report a synthetic strategy for the synthesis of knotty polymers and block copolymers by 1) designing supramolecularly templated macroinitiator, and 2) in-situ living free-radical polymerization via ring insertion polymerization (RIP)—RAFT process.

Experimental Section

Materials

All chemicals were purchased from Aldrich Chemical Company and were used directly without further purification unless otherwise indicated. Tetrahydrofuran (THF) was freshly distilled over sodium and benzophenone before use. All solvents were aspirated with nitrogen gas before use.

Figure 30:
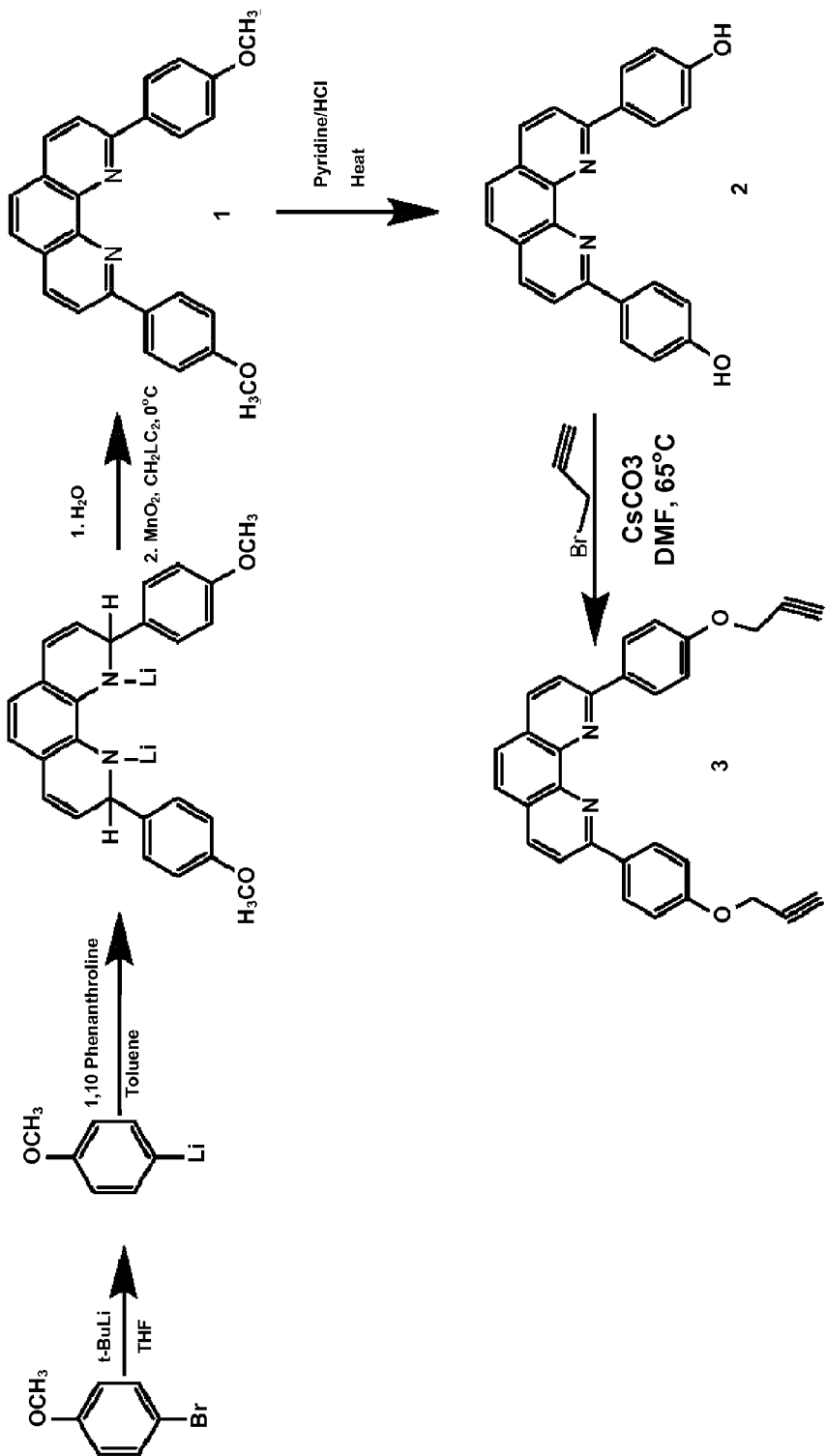
FIG. 30 depicts synthetic Scheme 1.

Characterization: $^1$H NMR spectra were recorded on a JEOL ECS 400 spectrometer MHz). GPC was carried out on a Viscotek 270 instrument with a triple detector array (RALS, IV, RI, or UV) equipped with 2 GMHHR-M and 1 GMHHR-L mixed bed ViscoGel columns (eluent: THF; flow rate: 1 mL A. Synthesis of the Knotted CTA Template Precursors
Scheme 1
Scheme 1 illustrates the synthesis of Diyne Phenanthroline Compound 3, an embodiment of a starting material for preparing compositions of this invention as shown in FIG. 30.

Synthesis of 2,9-di(p-anisyl)-1,10-phenanthroline (1) (Scheme 1)

Compound 1 was prepared by adapting the procedure reported by Becher et al.[26] p-Bromoanisole 4.23 mL (34 mmol) was dissolved in 100 mL degassed ether. After cooling the solution to −30° C., tert-BuLi 50 mL (1.7 mol/L, 85 mmol) was added by cannula. After stirring this mixture for 1.5 hour, it was transferred to the solution of pre-dried 1,10-N,N phenanthroline (1.76 g, 9.78 mmol) in 20 mL degassed toluene. The reaction mixture then stirred under nitrogen for 40 hours. After hydrolysis at 0° C. with water, the bright yellow toluene layer was decanted and aqueous layer extracted three times with dichloromethane. The combined organic layer was rearomatized by addition of $MnO_2$ (35 g), with efficient stirring. The yellow color partially disappeared. After $MnO_2$ was filtered and solvent removed, the crude product was recrystallized from toluene. Final purification was achieved by silica column chromatography using dichloromethane/methanol (100:1) as eluent to yield 1.6 g (3.9 mmol, 40%) of an amorphous white solid. $^1$HNMR ($CD_2Cl_2$): 8.42 (m, 4H, $H_o$), 8.30 (d, 2H, $H_{3,8}$), 8.11 (d, 2H, $H_{4,7}$), 7.78 (s, 2H, $H_{5,6}$), 7.14 (m, 4H, $H_m$), 3.94 (s, 6H, —$OCH_3$).

Synthesis of 2,9-di(p-phenol)-1,10-phenanthroline (Compound 2) (Scheme 1)

Compound 2 was prepared by the procedure reported by Sauvage et al.[27] Technical grade pyridine (16 mL) was placed in a 100 mL three-necked round-bottomed flask fitted with a thermometer and a magnetic stirrer. With rapid stirring concentrated hydrochloric acid (17.6 mL) was added. The flask was equipped for distillation, and water was distilled from the mixture until its internal temperature rose to 210° C. After cooling to 140° C., 1 (6.27 g, 16 mmol) was added as a solid and the reaction flask was fitted with a reflux condenser connected to a source of argon. The yellow mixture was stirred and refluxed for three hours (190° C.-220° C.). The hot react ion mixture was then diluted with 10 mL warm water and slowly poured into 60 mL hot water. The resulting bright yellow suspension was refrigerated overnight. After cooling, the precipitated solid was filtered by suction, and washed with cold water. Crude acidic diphenol Compound 2 was suspended (it dissolves partially) in an ethanol-water mixture (250/8.5 mL) and neutralized with a dilute NaOH solution. After this pH-meter monitored neutralization (end-point: pH=7,321, solution was diluted with hot water (300 mL). Neutral 2 precipitated as beige solid during cooling down. Filtrated by suction, it was air dried to yield 5.85 g of an ochre solid. Upon further drying (high vacuum in presence of $P_2O_5$) the latter turned bright red (5.31 g, 92% yield) and could be utilized without further purification. $^1$H-NMR (DMF): 10.14 (s, 2H, —OH); 8.56 (d, 4H, Ho); 8.55 (d, 2H, H4 or H7); 8.37 (d, 2H, H3 or H8); 7.98 (s, 2H, H5 and H6); 7.14 (d, 4H, $H_s$,).

Synthesis of diyne phenanthroline (Compound 3) (Scheme 1)

Compound 3 was prepared by procedure reported by Dietrich-Bucheker et al.[28] A degassed solution of 1 (0.982 g, 2.7 mmol) in DMF (30 mL) was added dropwise within 1 h under efficient stirring to an argon-flushed suspension of $Cs_2CO_3$ (3 g, 9.2 mmol) in 250 mL of DMF kept at 55° C.-60° C. After this addition the resulting suspension had a brown-red color; stirring and heating was continued for 1 h after which slow addition of propargyl bromide (0.702 g, 5.9 mmol) in degassed DMF (20 mL) was started. During this addition (2 h) the temperature was kept between 55° C. and 60° C., and the suspension turned progressively yellow. Stirring and heating was further continued for 24 h. DMF was then evaporated, and the dry residue was taken up in $H_2O$—$CH_2Cl_2$. The aqueous layer was extracted with three 100-mL portions of $CH_2Cl_2$; combined organic layers were dried over $MgSO_4$, filtrated, and evaporated to dryness: crude 3 was thus obtained quantitatively (1.188 g) as a yellow solid. Column chromatography on silica gel (eluent $CH_2Cl_2$/hexane, 50:50) gave 0.926 g of pure compound 3 as pale yellow needles (m.p. 273-274° C., 78% yield, pure $CH_2Cl_2$). $^1$H NMR ($CDCl_3$): 8.44 (d, 4H, $H_a$), 8.31 (d, 2H, $H_4$ or $H_7$), 8.12 (d, 2H, $H_3$ or $H_8$), 7.79 (s, 2H, $H_5$ and $H_6$), 7.20 (d, 4H, $H_m$), 4.83 (d, J≈2.40 Hz, 4H, $CH_2$—C≡C (t, J≈2.40 Hz, 2H, C≡CH).

Scheme 2

Figure 31:
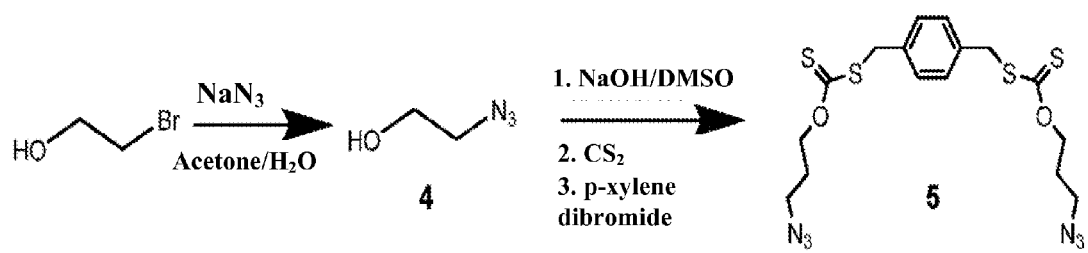
FIG. 31 depicts synthetic Scheme 2.

Scheme 2 illustrates the synthesis of Azide CTA Compound 5, an embodiment of a starting material for preparing compositions of this invention as shown in FIG. 31.

Synthesis of 2-azidoethanol (Compound 4) (Scheme 2)

A mixture of $NaN_3$ (5.13 g, 122 mmol) in water (60 mL), 2-bromoethanol (7.51 g, 60.5 mmol), and n-$Bu_4NBr$ (500 mg, 1.5 mmol) was added to a 100 mL flask. The mixture was stirred at 80° C. for 24 h. Then the mixture was extracted with ether (3×70 mL). The combined organic extracts were dried in anhydrous $MgSO_4$ overnight and concentrated. Then the crude product was received. $^1$H NMR (CDCl$_3$): d 3.74 (t, 2H, CH$_2$—OH), 3.45 (t, 2H, CH$_2$—N$_3$). Yield: 73%.

Synthesis of O-(2-azido-ethyl)S-benzyl dithiocarbonate (Compound 5) (Scheme 2)

A mixture of 2-azidoethanol (50 mmol) in DMSO (30 mL), NaOH (50 mmol) water solution was added to a 250 mL flask at room temperature. After stirring for 4 h, carbon disulfide (75 mmol) was added dropwise. The reaction mixture was stirred over night at room temperature, and benzyl chloride (50 mmol) was introduced. After 5 h, the reaction mixture was poured into ice water and extracted with ether (3×50 mL). The combined organic extracts were washed with water (2×50 mL). Dried over anhydrous MgSO4 and evaporated to afford a crude product, which was purified by column chromatography on silica gel (petroleum ester as an eluent) to give a yellow liquid (45% yield). $^1$H NMR (CDCl$_3$): d 3.65 (t, 2H, CH$_2$—N$_3$), 4.42 (s, 2H, CH$_2$—S—), 4.76 (t, 2H, CH$_2$—O—), 7.25-7.40 (m, 5H, CH aro).

B. Synthesis of the Templated CTA (Compound 6)

Scheme 3

Figure 32:
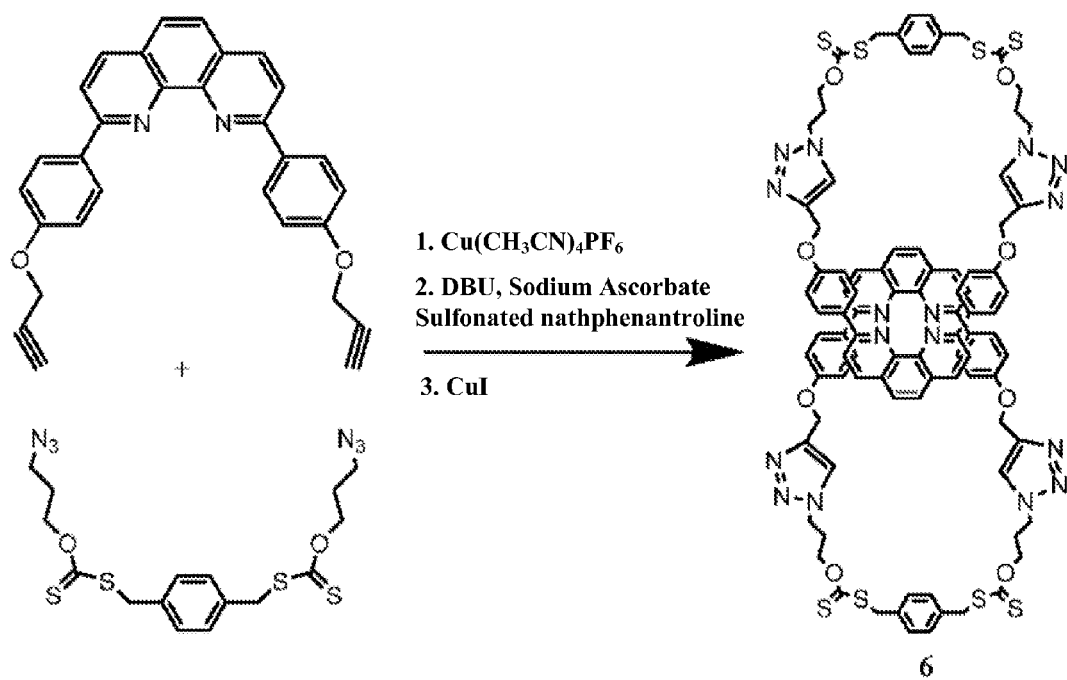
FIG. 32 depicts synthetic Scheme 3.

Scheme 3 illustrates the synthesis of a knotted CTA template Compound 6, an embodiment of a starting material for preparing compositions of this invention as shown in FIG. 32.

Synthesis of Compound 6 includes the reaction of Compound 3 and Compound 5 in the presence of Cu(CH$_3$CN)$_4$PF$_6$, DBU, sodium ascorbate sulfonated bathphenanthroline and CuI to yield the Compound 6 comprising an interlocked rings, where the linking groups are Compound 5, but as shown below can be a number of different groups.

C. Synthesis of the Cyclic CTA

Figure 33:
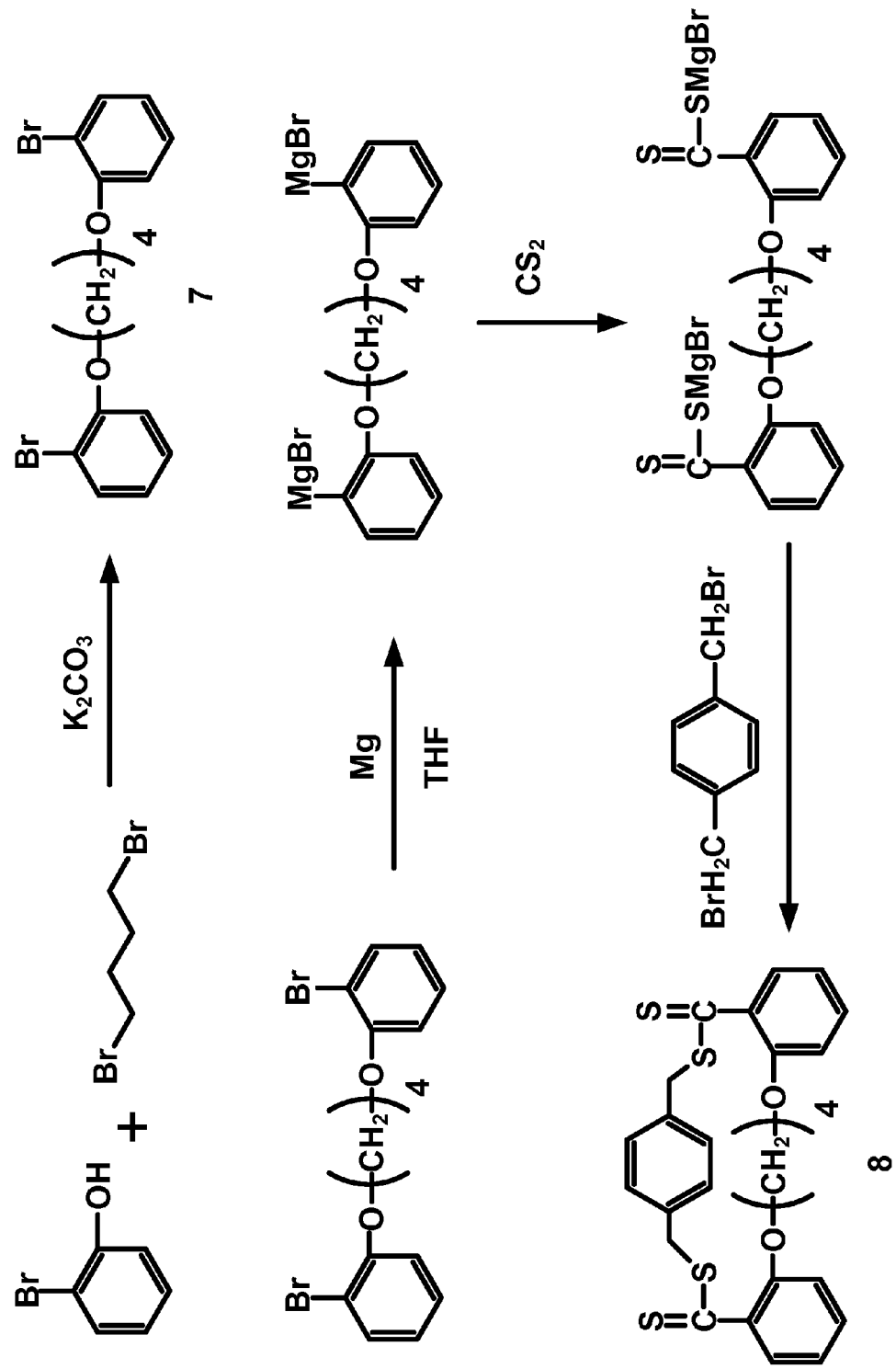
FIG. 33 depicts synthetic Scheme 4.

The synthesis was carried out using the procedure reported by Pan et al.[24] The details are described below and are outlined in Scheme 4 as shown in FIG. 33.

Synthesis of 1,4-Bis(o-bromophenoxy)butane (Compound 7)

Into a solution of o-bromophenol (20.76 g, 0.12 mol) in acetone (100 mL), K$_2$CO$_3$ (20.7 g, 0.15 mol) was added, and the mixture was stirred under a nitrogen atmosphere for 1 h. Then 1,4-dibromobutane (21.6 g, 0.1 mol) was dropped. The mixture was stirred at refluxing temperature for another 16 h and then cooled to room temperature. After most of acetone added was removed, CH$_2$Cl$_2$ (30 mL) and water (50 mL) were added. The organic layer was separated, and the aqueous phase was extracted with CH$_2$Cl$_2$ three times (3×20 mL). The combined extracts were washed with distilled water until neutral and then dried over anhydrous magnesium sulfate overnight. After the solvent was removed under reduced pressure, the crude product was recrystallized from benzene, and then the pure product was obtained as white crystal (34.5 g, 90% yield). 1H NMR (500 MHz, CDCl$_3$) δ (TMS, ppm): 1.8 (4H, 2 OCH2CH2); 3.9 (4H, 2 OCH2CH2); 7.0-7.4 (aromatic protons).

Synthesis of Cyclic Initiator Compound 8. Magnesium (0.34 g, 0.016 mol) in a 250 mL three-necked flask was "activated" by purging purified nitrogen while stirring, until the magnesium became gray-black in color. Then THF (100 mL) was added, and Compound 7 (2.9 g, 0.0073 mol) in THF (4 mL) was added dropwise in 1 h. The mixture was warmed to 40° C. Into the reaction mixture, carbon disulfide (1.35 g, 0.017 mol) was added in 30 min. After being maintained at 40° C. for 4 h, a,a'-dibromo-p-xylene (1.93 g, 0.0073 mmol) in THF (8 mL) was added slowly in 1 h. The temperature was raised to 50° C. and maintained at this temperature for 2 days. Ice water was added, the organic layer was separated, and the water phase was extracted with diethyl ether (total 500 mL). The extracts and organic phase were combined, washed with water until neutral, and dried over anhydrous magnesium sulfate. After removal of solvent, the residue was purified on a silica column with dichloromethane/petroleum ether (30° C.-60° C.) (v/v) as eluent. The cyclic initiator 8 was obtained as red solid (1.94 g, 57.6% yield); $^1$H NMR (500 MHz, CDCl$_3$), δ (TMS, ppm): 6.87-6.97, 7.24-7.36 (8H, aromatic Hs), 4.68 (4H, 2S—CH$_2$), 3.92 (4H, 2O—CH$_2$), 1.74 (4H, C—CH$_2$CH$_2$—C).

Scheme 4
Synthesis of the Cyclic CTA
Polymerization of MMA

The polymerization was carried out in nitrogen-filled tubes. The general synthetic procedure is as follows: MMA (0.93 g, 9.3 mmol), Compound 8 (0.04 g, 0.08 mmol), AIBN (0.0026 g, 0.016 mmol) and THF (8 mL) were added into a 10 mL glass tube. After the mixture was degassed by three freeze-evacuate-thaw cycles, the tube was sealed under vacuum and then subjected to polymerization in oil bath at 70° C. under nitrogen atmosphere. Aliquot (1 mL) of polymer solution was withdrawn at specified time intervals and was directly injected for GPC analysis.

Results and Discussion

Designing and Synthesis of the Supramolecularly Templated Macroinitiator

Figure 1:
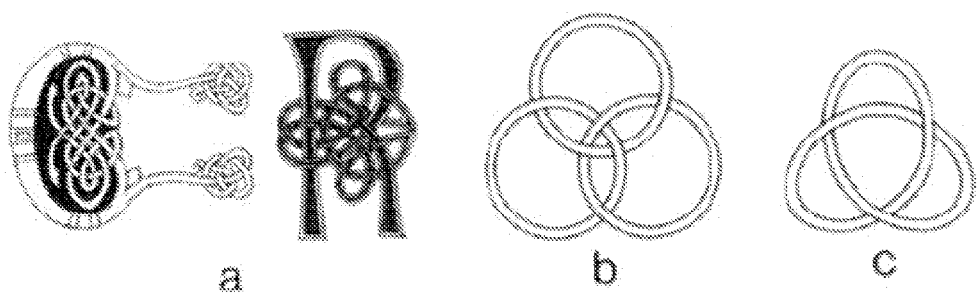
FIGS. 1A-C depict Kelsch's book (A), Borromean Symbol (B) and a trefoil knot (C).
Figure 2:
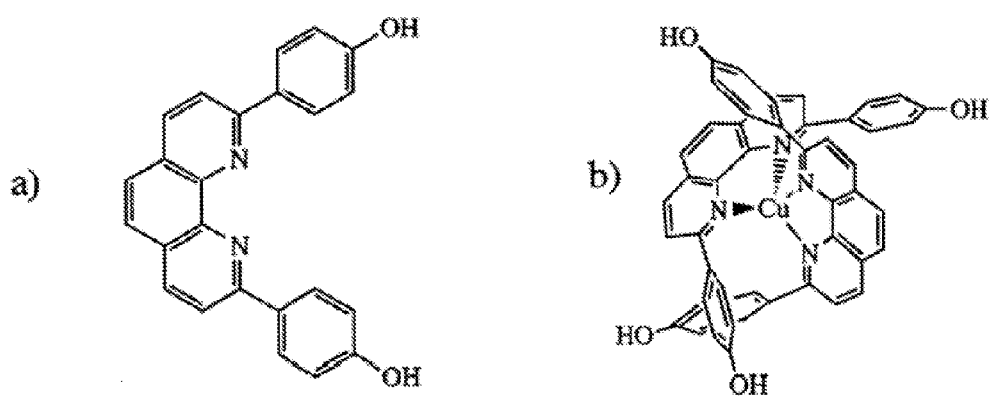
FIGS. 2 A-B depict the Sauvage Phenanthroline approach (A) and phenanthroline interlocked copper complex (B).
Figure 3:
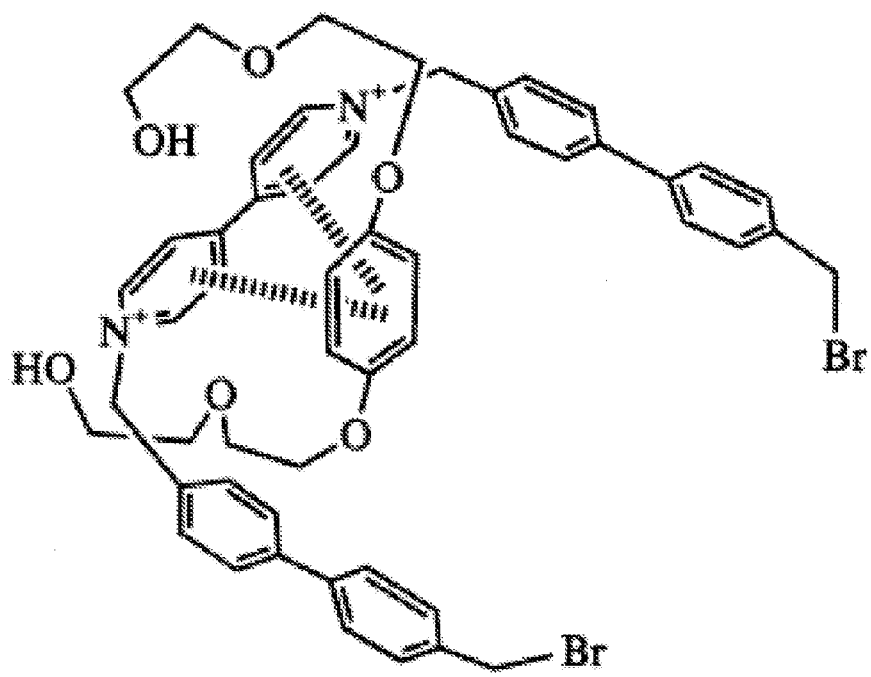
FIG. 3 depicts Stoddart's paraquat containing complex link.
Figure 4:
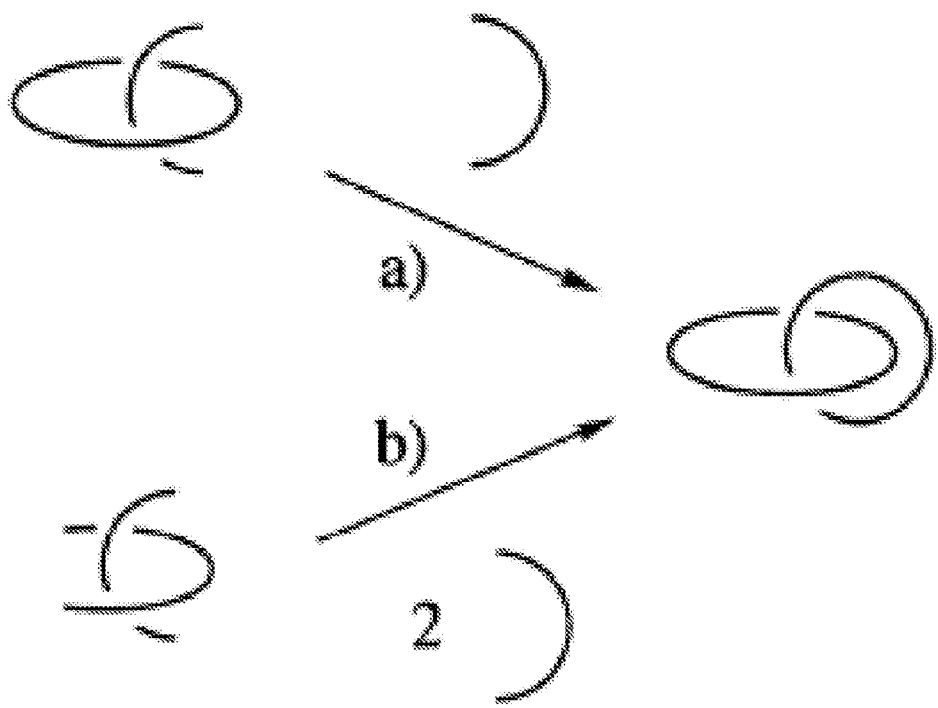
FIG. 4 depicts a two strategy for template catenane formation (a) ring-turn approach and (b) two-turn approach.
Figure 5:
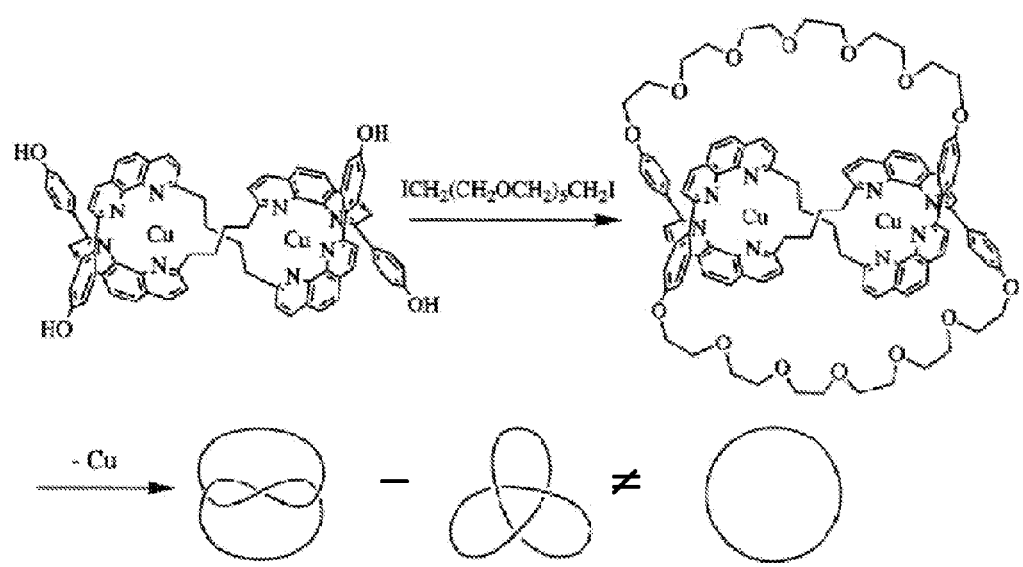
FIG. 5 depicts synthesis of a trefoil knot using a two-anchor helical template and a linear array of odd-even helical templates.
Figure 5:
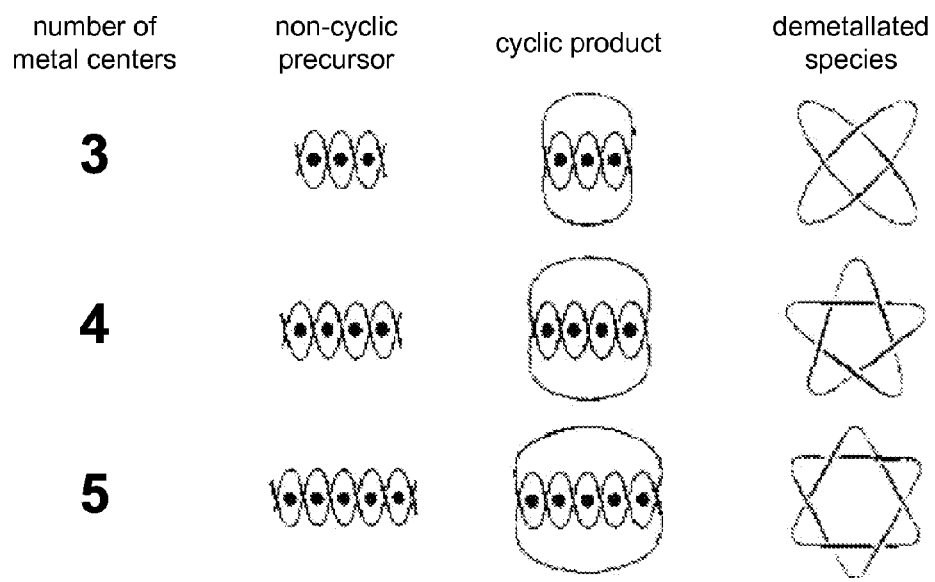
Figure 6:
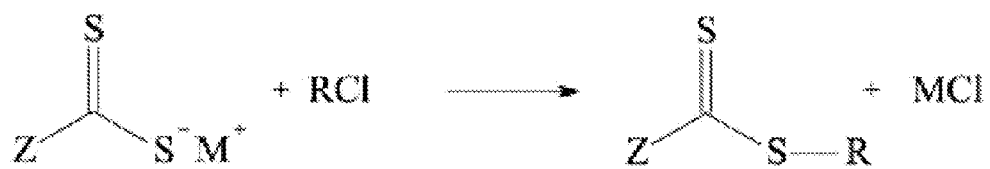
FIG. 6 depicts a typical dithioester CTA or iniferter that can be synthesized by nucleophilic substitution.
Figure 7:
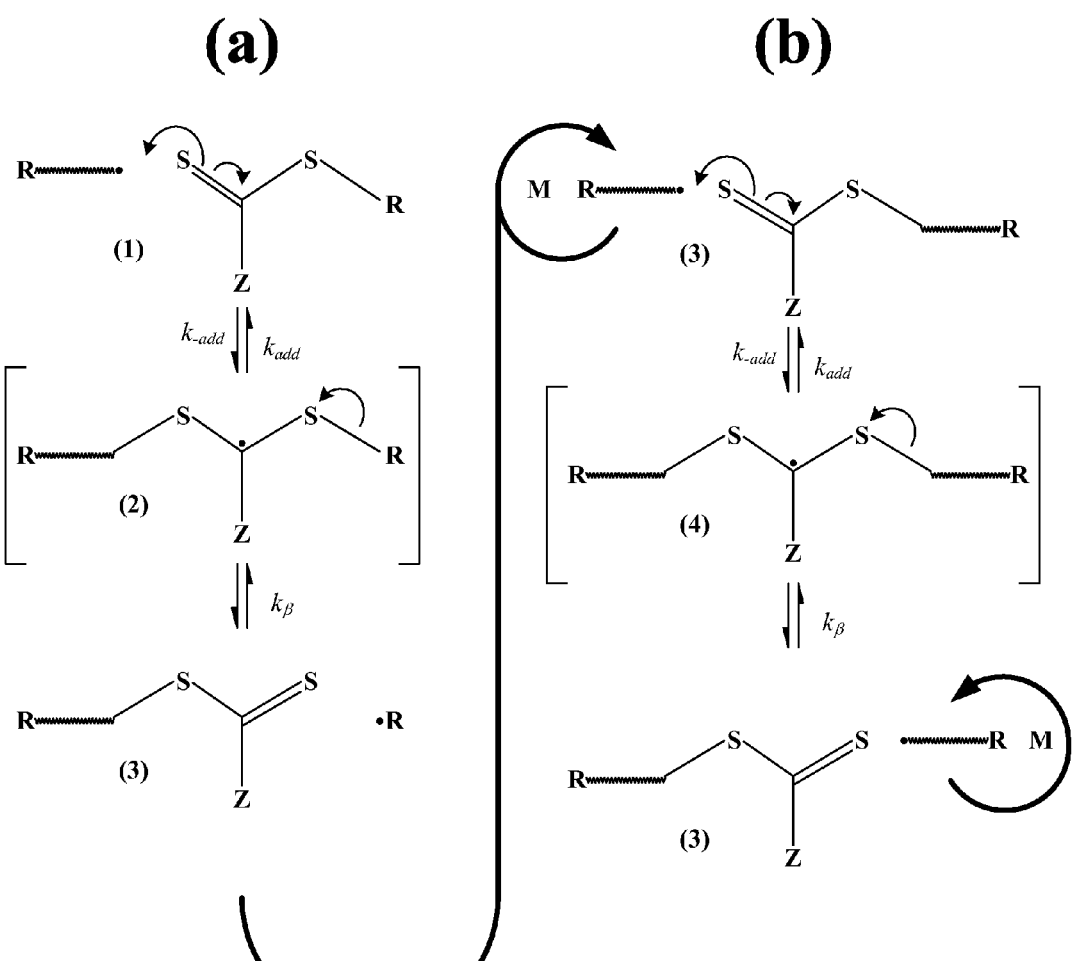
FIG. 7 depicts RAFT reaction equilibrium (a) and radical pathway (b).
Figure 34:
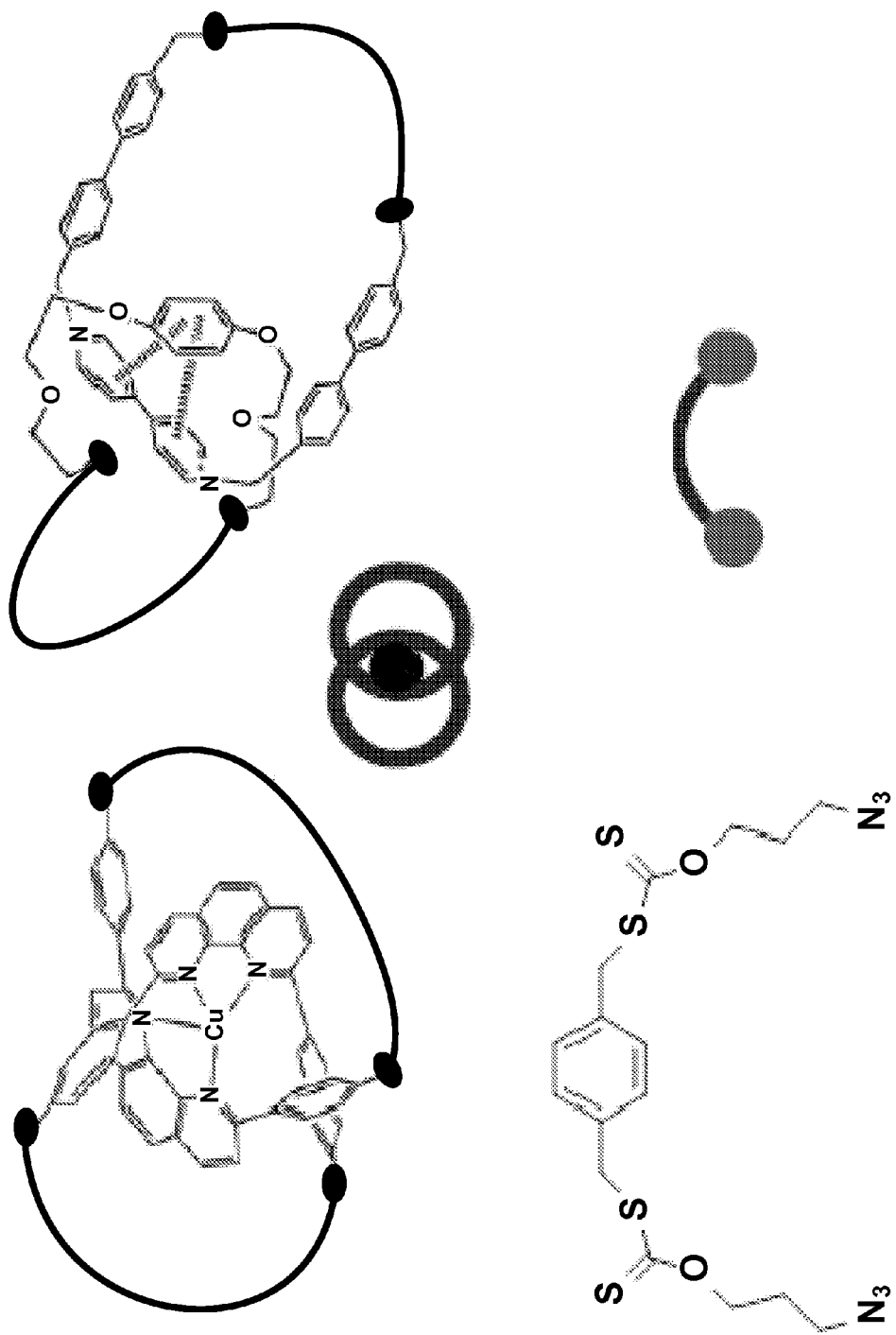
FIG. 34 depicts chemical templates and their corresponding symmetrical iniferters.

Various chemical templates or knot precursors may be synthesized based on molecular knots, complexes, catenates, and catenands. Synthesis of supramolecularly template macroinitiator nay be designed based on well-reported interlocked molecular structures based on metal ion templates, hydrogen bonded templates, cyclodextrin templates, and p-donor, p-acceptor templates and capping of these complexes with difunctional symmetrical iniferters as shown in FIG. 34. Embodiments of this invention using Sauvage's phenanthroline template, 2,9-bis(phydroxyphenyl)-1,10-phenanthroline, as a macroinitiator, were studied, because the macroinitiator forms a tetrahedral Cu (I) ion metal complex in which the phenanthroline units are arranged perpendicular to each other. In addition, it has been reported that by linking the two of phenanthroline-based molecular turns with a methylene group, a pair of linked turns is produced and complexation of these ligands with two copper (I) ion gave highly ordered double helical complex.[17] The extension of this helical approach to larger linear arrays of metal ions produces increasingly complex knots as shown in FIG. 5, which shows the synthesis of a trefoil knot using a two-anchor helical template and a linear array of odd-even helical templates.

Some of the important aspects that need to be considered while designing the difunctional symmetrical iniferters is that they easily cap the open ends of the template, easy to synthesize and should not decompose under experimental conditions. Several methods have been used to synthesize RAFT agents including trithiocarbonates, xanthates, and dithiocarbamates.[30] In most cases the thiocarbonyl compounds are relatively unstable at high temperatures and in harsh experimental conditions. Since it has been reported that xanthate derivative of RAFT agents are more stable[31] and relatively easier to synthesize, we have chosen a xanthate RAFT agent to start with. In order to close the ends of the template, we chose to use the CuAAC chemistry or click chemistry because of the advantage of the reaction's orthogonality. With these, we have designed and synthesized RAFT agent Compound 5 with an azide end functionality, which could be easily clicked under mild reaction conditions to the alkyne ends of the phenanthroline template Compound 3 to obtain the templated macroinitiator Compound 6 (Scheme 3). This macroinitiator Compound 6 will be used later on in the formation of the knotty polymers.

Figure 35:
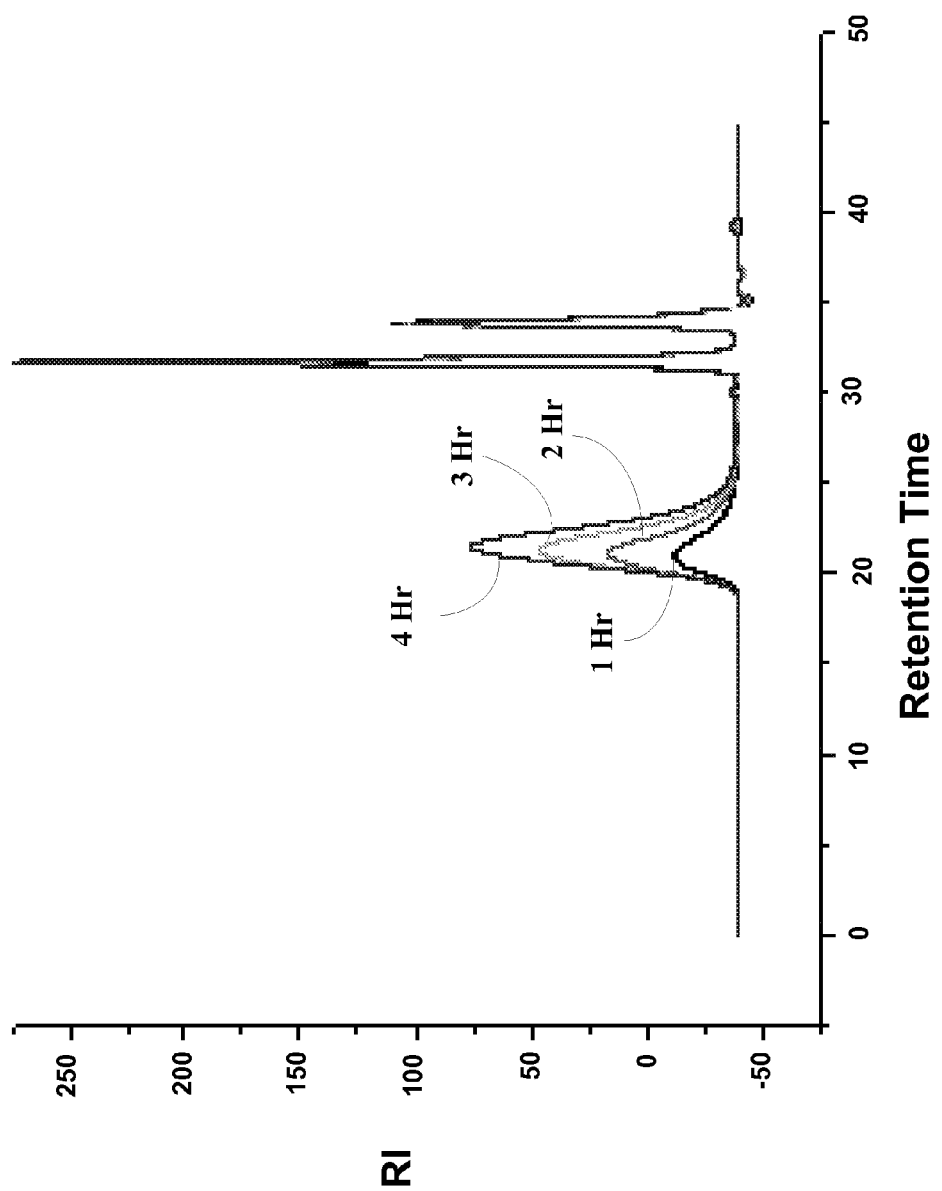
FIG. 35 depicts GPC curves of the PMMA using the cyclic CTA.

In-situ living free-radical polymerization in ring insertion polymerization (RIP) RAFT process. Ring insertion polymerization is gaining popularity in developing cyclic nanostructures because it yields a monodispersed material, amenable to large-scale industrial applications and suitable to obtain cyclic block copolymers. We used this process as a model system to study the means of characterization of cyclic systems, which would also be eventually applicable to the analogous knotty polymers. To understand the kinetics and monomer diffusion aspects of controlled radical polymerization by monomer insertion into a cyclic initiator, we have synthesized cyclic initiator Compound 8 as a model precursor and studied ring insertion polymerization by thermal initiation and using MMA as monomer. Upon thermal initiation, the cyclic initiator homolytically splits into active and stable radicals. The former radical initiates the polymerization of monomer, forming a propagating radical. In a local medium, the active chain radical propagates or terminates with the original stable radical, thus they are competing reactions. When the propagation reaction is too fast, it is difficult for the propagating radical to react with the original stable radical because they diffuse apart. Therefore, after the propagating radical reacts with several monomers, the propagating chain will reversibly terminate with the original stable radical. When the cyclic chain conformation is adjusted, this process will repeat again until a cyclic polymer with predetermined ring size is formed. We monitored the growth of cyclic polymer by GPC analysis. The GPC curves, as shown in FIG. 35, of the polymers formed after 1, 2, 3 and 4 hours shows a relatively symmetrical distribution curve, which may indicate the presence of a monomodal type of monomer that could either be all cyclic or all linear polymers.

The data in Table 1 shows that after two hours of polymerization, the retention time and volume remained constant but with increasing polymer concentration based on the area under the GPC curves. From the data, we can deduce that a saturation point was already achieved after 2 hours, thus giving the same retention volumes. It could either be that the hydrodynamic volumes are constant but not necessarily the molecular weights of the polymer or there is an increase in the formation of polymers with the same molecular weights. Another possibility is that there are also varying degree of folding conformations with the same hydrodynamic volumes in the polymers formed in solution. As of now, we are still investigating this phenomenon and we still need more experiments to confirm our hypotheses.

TABLE 1

Results of Polymerization of Mma Using the Cyclic Initiator 8

| Time | $M_w$ | $M_n/M_w$ |
|---|---|---|
| 1 hr | 73,992 | 1.817 |
| 2 hr | 79,532 | 1.802 |
| 3 hr | 79,553 | 1.914 |
| 4 hr | 79,618 | 1.802 |

Figure 36:
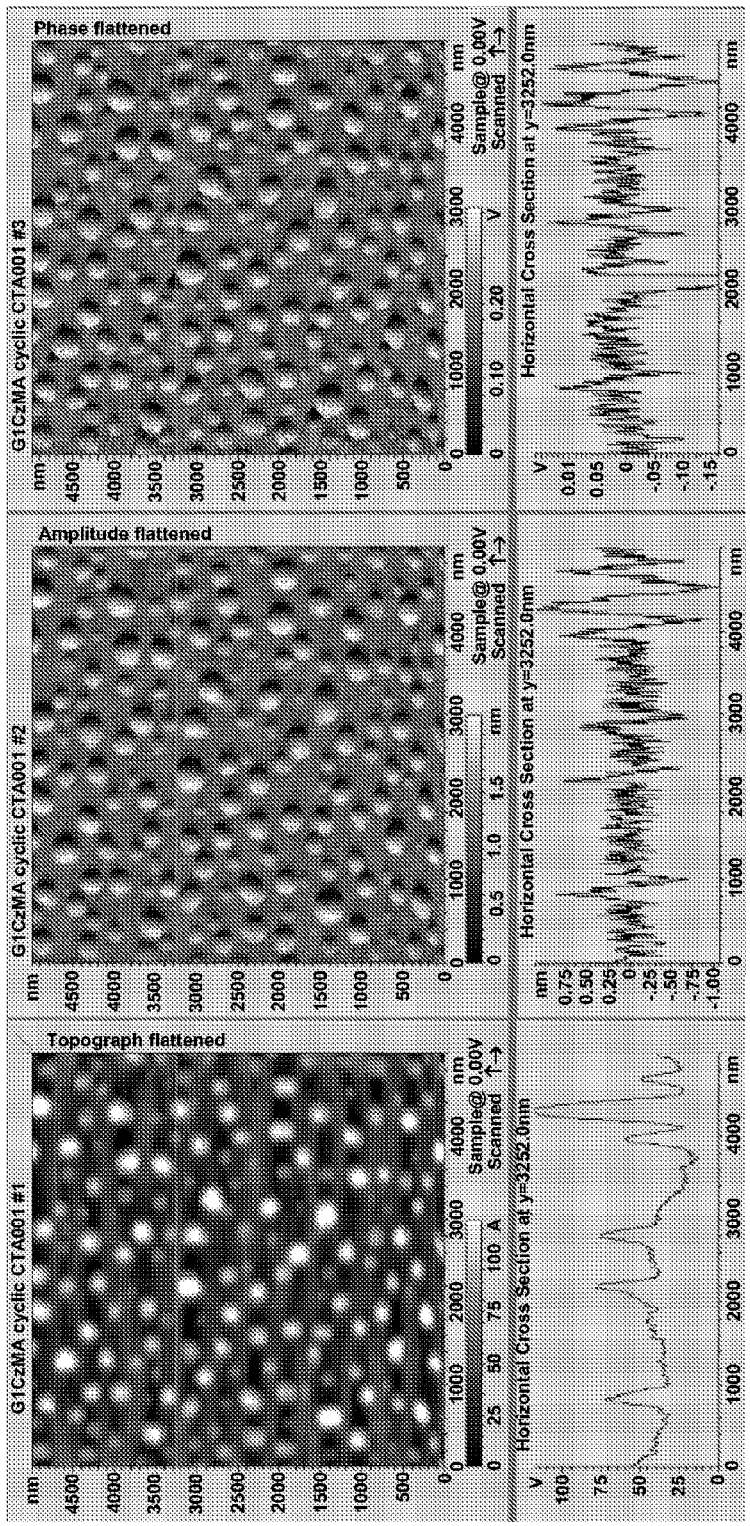
FIG. 36 depicts AFM images of G1 carbazole-based PMMA.

Polymerization of a dendronized monomer was also done using the cyclic initiator to amplify the ring formation for AFM analysis as shown in FIG. 36. In this case we used a G1 carbazole-based methacrylate monomer. The reaction was carried out for 4 hours and an aliquot was taken after 30 mins, 1000 μL of it diluted with 1 mL dry THF and was spin-casted for 60 secs on a silicon wafer at a speed of 1000 rpm. The spin-casted film was dried after which a very thin polymer film was formed. The AFM, as shown in FIG. 36, of the spin-casted film shows a monodispersed type of globular shaped domains, which could be a representative of self-assembled polymer molecules. Ring formation is not found due to the possible aggregation of more than one polymer molecule or lack of chain stiffness. Several solvents are now being tried to disperse the system to smaller domains up to possibly single polymer molecules.

CONCLUSIONS

In several embodiments, the efficient synthetic strategy for supramolecularly templated macroinitiator based on CuAAC click reaction of alkyne functionalized Sauvage's phenanthroline templates and azide functionalized RAFT agent was illustrated. The precursors for the macro template were successfully synthesized and involve the final click chemistry to get the final macroinitiator. Polymerization of MMA using model cyclic initiator shows some interesting phenomena, which demonstrates a ring insertion polymerization mechanism for forming unique knotty polymers.

REFERENCES USED IN THE SPECIFICATION

The following references were cited in the Experiments of the Invention section as background information concerning the synthetic procedures used in preparing the compositions of this invention.
(1) (a) Nasongkla, N.; Chen, B.; Macaraeg, N.; Fox, M. E.; Fre'chet, J. M. J.; Szoka, F. C. J. Am. Chem. Soc. 2009, 131, 3842-3843. (b) Eugene, D. M.; Grayson, S. M. Macromolecules 2008, 41, 5082-5084. (c) Guan, Z. J. Polym. Sci., Part A: Polym. Chem. 2003, 41, 3680-3692. (d) Guan, Z. Chem. sEur. J. 2002, 8, 3086-3092. (e) Harth, E. M.; Hecht, S.; Helms, B.; Malmstrom, E. E.; Fre'chet, J. M. J.; Hawker, C. J. J. Am. Chem. Soc. 2002, 124, 3926-3938. (f) Edgecombe, B. D.; Stein, J. A.; Fre'chet, J. M. J.; Xu, Z.; Kramer, E. J. Macromolecules 1998, 31, 1292-1304.
(2) For reviews, see: (a) Matyjaszewski, K.; Xia, J. Chem. ReV. 2001, 101, 2921-2990. (b) Kamigaito, M.; Ando, T.; Sawamoto, M. Chem. ReV. 2001, 101, 3689-3746. (c) Schluter, A. D.; Rabe, J. P. Angew. Chem., Int. Ed. 2000, 39, 864-883.
(3) (a) Tezuka, Y.; Fujiyama, K. J. Am. Chem. Soc. 2008, 127, 6266-6270. (b) Jeong, W.; Hedrick, J. L.; Waymouth, R. M. J. Am. Chem. Soc. 2007, 129, 8414-8415. (c) Culkin, D. A.; Jeong, W.; Csihony, S.; Gomez, E. D.; Balsara, N. P.; Hedrick, J. L.; Waymouth, R. M. Angew. Chem., Int. Ed. 2007, 46, 2627-2630. (d) Pyun, J.; Kowalewski, T.; Matyjaszewski, K. Macromol. Rapid Commun. 2003, 24, 1043-1059. (e) Bosman, A. W.; Vestberg, R.; Heumann, A.; Fre'chet, J. M. J.; Hawker, C. J. J. Am. Chem. Soc. 2003, 125, 715-728. (f) Shu, L.; Schluter, A. D.; Ecker, C.; Severin, N.; Rabe, J. P. Angew. Chem., Int. Ed. 2001, 40, 4666-4669.
(4) (a) Amabilino, D. B.; Stoddart, J. F.; Chem. Rev. 1995, 95, 2725. (b) Sauvage, J.-P.; Acc. Chem. Res. 1990, 23, 319. (c) Vogtle, F.; Dunwald, F.; Schmidt, T.; Acc. Chem. Res. 1996, 29, 451. (d) Gibson, H. W.; Rotaxanes in Large Ring Molecules. J. A. Semlyen Editor, Jhon Wiley & Sons, 1996. (f) Dietrich-Bucheker, C. O.; Sauvage, J.-P.; Chem. Rev. 1987, 87, 795.
(5) (a) Graessley, W. W.; Adv. Polym. Sci. 1974, 16, 3. (b) Graessley, W. W.; Adv. Polym. Sci. 1982, 47, 68.

(6) Wu, S.; Polymer Interface and adhesion. Marcel Dekker, New York, 1982.
(7) (a) Plummer, C. J. G.; Mauroux-Cudre, N.; Kaush, H.-H.; Polym. Eng. Sci. 1994, 34, 318. (b) Ottani, S.; Porter, R. S.; Macromol. Rapid Commun. 1995, 16, 813.
(8) Brown, H. R.; Russell, T. R.; Macromolecules 1996, 29, 798.
(9) Zhang, Y.; Wiesner, U.; J. Chem. Phys. 1995, 103, 4784.
(10) Grassley, W. W. Viscoelasticity and Flow in Polymer Melts and Concentrated Solutions. In: Physical Properties of Polymers. American Chemical Society, Symposium Series n° 84, Washington D.C., 1984, pp 97-153.
(11) Schill, G. Catenanes, Rotaxanes, and Knots. Academic Press, 1971.
(12) C. O. Dietrich-Buchecker, J.-P. Sauvage, Chem. Rev. 1987, 87, 795.
(13) D. M. Amabillino, J. F. Stoddart, Che. Rev. 1995, 95, 2725.
(14) E. Wasserman, J. Am. Chem. Soc. 1960, 82, 4433.
(15) Busch, D H; Stephenson, N A; Chem. Rev. 1990, 100, 119-154.
(16) Walba, D. M.; Tetrahedron, 1985, 41, 3161.
(17) J. P. Sauvage, Chem. Eur. J. 2005, 11, 4374-4386.
(18) Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H. Macromolecules 1998, 31, 5559-5562.
(19) Wang, J.-S.; Matyjaszewski, K. J. Am. Chem. Soc. 1995, 117, 5614-5615
(20) Hawker, C. J.; Bosman, A. W.; Harth, E. Chem. Rev. 2001, 101, 3661-3688.
(21) Yutani, Y.; Tatemoto, M. Europ. Pat. 489370; Chem. Abstr. 1992, 118:7515.
(22) Rique-Lurbet, L.; Schappacher, M.; Deffieux, A. Macromolecules 1994, 27, 6318.
(23) Deffieux, A.; Schappacher, M.; Rique-Lurbet, L. Polymer 1994, 35, 4562.
(24) He, T.; Zheng, G.; Pan, T. Macromolecule 2003, 36, 5960-5966.
(25) Boydston, A.; Holcombe, T.; Unruh, D.; Frechet, J.; Grubbs, R. J. Am. Chem. Soc. 2009, 131, 5388-5389.
(26) Bang, S, K.; Nielsen, B. M.; Zubarev, R.; Becher, J. Chem. Commun. 2000, 215-216.
(27) Dietrich-Bucheker, C.; Sauvage, J. P; Tetrahedron 1990, 46, 502.
(28) Dietrich-Bucheker, C. J. Am. Chem. Soc. 1990, 112, 8006.
(29) Megiatto, J.; Schuster, D. J. Am. Chem. Soc. 2008, 130, 12872-12873
(30) (a) Wood, M. R.; Duncalf, D. J.; Rannard, S. P.; Perrier, S. Org Lett 2006, 8, 553-556; (b) Perrier, S.; Takolpuckdee, P. J Polym Sci Part A: Polym Chem 2005, 43, 5347-5393; (c) Adewuyi, Y. G.; Appaw, C. Ind Eng Chem Res 2002, 41, 4957-4964; (d) Bouhadir, G.; Legrand, N.; Quiclet-Sire, B.; Zard, S. Z. Tetrahedron Lett 1999, 40, 277-280; (e) Kwak, Y.; Nicolay, R.; Matyjaszewski, K. Macromolecules 2009, 42, 3738-3742; (f) Barany, G.; Schroll, A. L.; Mott, A. W.; Halsrud, D. A. J Org Chem 1983, 48, 4750-4761.
(31) (a) Chiefari, J.; Chong, Y. K.; Ercole, F.; Krstina, J.; Jeffery, J.; Le, T. P.; Mayadunne, R. T. A.; Meijs, G. F.; Moad, C. L.; Moad, G.; Rizzardo, E.; Thang, S. H. Macromolecules 1998, 31, 5559-5562.
(32) Sugai, N.; Heguri, H.; Ohta, K.; Meng, Q.; Yamamoto, T.; Tezuka, Y. J. Am. Chem. Soc., 132, 14790-14802 (2010).
(33) Adachi, K.; Honda, S.; Hayashi, S.; Tezuka, Y. Macromolecules, 41, 7898-7903 (2008).
(34) Lonsdale, D.; Monteiro, M. Chem. Commun., 2010, 46, 7945-7947.

All references cited herein are incorporated by reference for all purposes permited under the applicable United States statutes set forth in 35 U.S.C. et seq, rules set forth in 37 CFR et seq and regulation in the MPEP et seq. Although the invention has been disclosed with reference to its preferred embodiments, from reading this description those of skill in the art may appreciate changes and modification that may be made which do not depart from the scope and spirit of the invention as described above and claimed hereafter. The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

We claim:

1. A method for forming knotty polymers comprising:
providing a supramolecular template comprising a plurality of molecules, each molecule including at least two arms terminating in a coupling group, where the template is held together via chemical and/or physical interactions and the coupling groups are oriented capable of forming macrocyclic compounds, and
interconnecting template coupling groups to form knotty macrocyclic compounds comprising at least one template and including at least two interlocking rings or at least one knot,
where the arms are either pre-formed or formed via living free-radical polymerization.

2. The method of claim 1, wherein the template comprises: an ion-ligand complex template including at least two molecules and at least one metal atom or ion and held together by ion-ligand interactions, an π-π stacked molecular template including at least two molecules held together by π-π interactions, an ion-dipole molecular template including at least two molecules held together by ion-dipole interactions, and/or a hydrogen bonded molecular template including a least two molecules held together by hydrogen bond interactions, where the interactions orient the molecules into to form the knotty macrocyclic compounds.

3. The method of claim 2, wherein the template comprises:
(1) at least two phenanthroline molecules complexed to a metal atom or ion orienting hydroxy coupling groups;
(2) electron rich aromatic ether moieties and paraquat-containing moieties forming a π-donor:acceptor templates, which orients the coupling groups; (3) α,ω-diphenanthrolinyl alkane template, which orients the coupling groups; and (4) mixtures or combinations thereof.

4. The method of claim 1, wherein the arm is formed by:
living radical polymerizing at least one monomer onto polymerization initiators associated with the molecules of the template, where the living radical polymerization is selected from the group consisting of living atom transfer radical polymerization (ATRP), living nitroxide mediated polymerization (NMP), living reversible addition fragmentation chain-transfer (RAFT), living metathesis polymerization, living ring-expansion or polyhomologation polymerization or combinations thereof to form the arms, terminating the living radical polymerization with coupling groups to form arm extended templates, where the arms have an average of n monomer units, where n is a number having a value between about 1 and 100,000, and contacting the arm extended templates with a coupling reagent under condition to facilitate couplings between pairs of coupling groups on the arms of the arm extended templates to form the knotty macrocycle compounds comprising at least one arm extended template and at least one coupled pair of coupling groups and including at least two interlocking rings or at least one knot.

5. The method of claim 4, wherein the living polymerizing step comprising:
polymerizing a first block of a first monomer, and
polymerizing a second block of a second monomer,
where the arms are block co-polymeric arms.

6. The method of claim 4, wherein the living polymerizing step comprising at least two monomers and the arms are random co-polymeric arms.

7. The method of claim 4, wherein the living polymerizing step comprising:
polymerizing a first block of a first monomer,
polymerizing a second block of a second monomer,
polymerizing a third block of a third monomer,
where the arms are block ter-polymeric arms and where the first monomer and the second monomer are the same or different.

8. The method of claim 4, wherein the living polymerizing step comprising at least three monomers and the arms are random ter-polymeric arms.

9. The method of claim 1, wherein the interconnecting comprises:
contacting the template with a pre-formed arm having an arm coupling group and a coupling group under conditions, where the template coupling groups couple to the arm coupling groups to form the arm extended template, and
contacting the arm extended templates with a coupling reagent under condition to facilitate couplings between pairs of coupling end groups of the arms of the arm extended templates to form the knotty macrocycle compounds comprising at least one arm extended template and a plurality of coupling groups and including at least two interlocking rings or at least one knot.

10. The method of claim 9, wherein the pre-formed arms comprise homopolymeric arms, co-polymeric arms, ter-polymeric arms, or arms including at least four different monomer units.

11. The method of claim 1, wherein the interconnecting comprises:
contacting the template with a closing group including closing coupling groups under conditions to couple the template and the closing groups to form the knotty macrocycle compounds comprising at least one arm extended template and a plurality of coupling groups and including at least two interlocking rings or at least one knot.

12. The method of claim 11, wherein the closing group comprises:
a polymeric closing group having an average of n monomer units, where n is a number having a value between about 1 and 100,000.

13. The method of claim 12, wherein the polymeric closing group comprises a homopolymer, a block co-polymer, a random co-polymer, a block polymer having a plurality of blocks of at least two monomers, a random polymer of at least three monomer, and mixtures or combinations thereof.

14. The method of claim 1, wherein the template is tethered to or disposed on a surface.

15. The method of claim 1, further comprising:
depositing the knotty polymer on a surface.

16. A composition comprising:
at least one template including a plurality of reactive end groups, where template comprises:
(1) at least two phenanthroline molecules complexed to a metal atom or ion orienting the hydroxy end groups so that coupling the hydroxy end groups forms the knotty macrocyclic compounds; (2) electron rich aromatic ether moieties and paraquat-containing moieties, as $\pi$-donor:acceptor templates; (3) $\alpha,\omega$-diphenanthrolinyl alkane templates; and (4) mixtures or combinations thereof and
a plurality of interconnecting moieties interconnecting pairs of reactive end groups to form a knotty polymer having at least two interlocking rings or at least one knot,
where the interconnecting moieties comprise polymeric moieties formed by living radical polymerization, pre-formed arms formed by living radical polymerization, or pre-formed linking or closing groups formed by living radical polymerization.

17. The composition of claim 16, wherein the interconnecting moieties comprise:
the polymeric moieties having an average of n monomer units, where n is a number having a value between about 1 and 100,000, and coupled together by a coupling reagent, where the polymeric moieties where polymerized onto the template and coupled together with a coupling reagent or a linking group.

18. The composition of claim 17, wherein the polymeric moieties comprise homopolymeric moieties, block polymeric moieties including at least two monomers, and/or random polymeric moieties including at least two monomers.

19. The composition of claim 16, wherein the interconnecting moieties comprise:
the pre-formed arms and coupled together by a coupling reagent, where the polymeric moieties where polymerized onto the template and coupled together with a coupling reagent or a linking group.

20. The composition of claim 19, wherein the pre-formed arms comprise homopolymeric moieties, block polymeric moieties including at least two monomers, and/or random polymeric moieties including at least two monomers.

21. The composition of claim 16, wherein the interconnecting moieties comprise:
the pre-formed linking or closing groups.

22. The composition of claim 21, wherein the linking or closing groups comprise:
polymeric moieties having an average of n monomer units, where n is a number having a value between about 1 and 100,000.

23. The composition of claim 22, wherein the polymeric moieties comprise homopolymeric moieties, block polymeric moieties including at least two monomers, and/or random polymeric moieties including at least two monomers.

24. The composition of claim 16, wherein knotty macrocyclic compounds are formed on a surface of a substrate.

25. The composition of claim 16, wherein knotty macrocyclic compounds are deposited on a surface of a substrate.

\* \* \* \* \*